(12) United States Patent
Saadat et al.

(10) Patent No.: US 12,705,589 B1
(45) Date of Patent: Aug. 11, 2026

(54) FACILITATING PAYMENTS FOR MERCHANTS THAT USE MULTIPLE PAYMENT SERVICE PROVIDERS

(71) Applicant: Block, Inc., Oakland, CA (US)

(72) Inventors: Behroz Saadat, Milton (CA); Andrew Steele, San Francisco, CA (US); Dean Papastrat, Issaquah, WA (US); Pritesh Bodalia, Waterloo (CA); Deepkarn Bedi, Sausalito, CA (US)

(73) Assignee: Block, Inc., Oakland, CA (US)

( * ) Notice: Subject to any disclaimer, the term of this patent is extended or adjusted under 35 U.S.C. 154(b) by 76 days.

(21) Appl. No.: 18/673,013

(22) Filed: May 23, 2024

(51) Int. Cl.
*G06Q 20/08* (2012.01)
*G06Q 20/40* (2012.01)

(52) U.S. Cl.
CPC ............ *G06Q 20/08* (2013.01); *G06Q 20/40* (2013.01)

(58) Field of Classification Search
CPC .............................. H06Q 20/08; G06Q 20/40
USPC .......................................................... 705/39
See application file for complete search history.

(56) References Cited

U.S. PATENT DOCUMENTS

2003/0004867 A1* 1/2003 Kight .................... G06Q 20/04 705/39
2003/0126074 A1* 7/2003 Klatt .................... G06Q 20/102 705/40
2007/0078761 A1* 4/2007 Kagan ................. G06Q 20/322 705/39
2010/0211491 A1* 8/2010 Kagan .................... G06Q 20/10 455/414.1
2014/0058927 A1* 2/2014 Schwarzkopf ......... G06Q 20/20 705/35
2020/0356978 A1* 11/2020 Bhoiwala ............ G06Q 20/326

* cited by examiner

*Primary Examiner* — Hai Tran
(74) *Attorney, Agent, or Firm* — Lee & Hayes, P.C.

(57) ABSTRACT

Facilitating payments for merchants that use multiple payment service providers (PSPs) is described. A first request may be received to establish a first on-file grant, wherein the first request indicates a first PSP used by a merchant. A request to associate a second PSP with the merchant may be received from a merchant device of the merchant, and a group association between the merchant, the first PSP, and the second PSP may be stored. A second request indicating that a transaction will be processed using the second PSP may be received, and, based on the group association, it may be determined that an identifier associated with a user account of a user can be used for the transaction. A second on-file grant may be established, and a response to the second request may be sent to indicate approval to use the identifier for payment of the transaction.

20 Claims, 14 Drawing Sheets

400

Merchant Web Portal http://www.merchantwebportal.com/managePSPs

Your Account

Manage your payment service providers (PSPs) below:

1 Activate multi-PSP mode or switch to a different PSP?:

- Activate multi-PSP mode
- Switch to a different PSP

410

2 Provide PSP identifier of target PSP:

PSP: PSP_Identifier

404

3 Ready to go live? Save

408

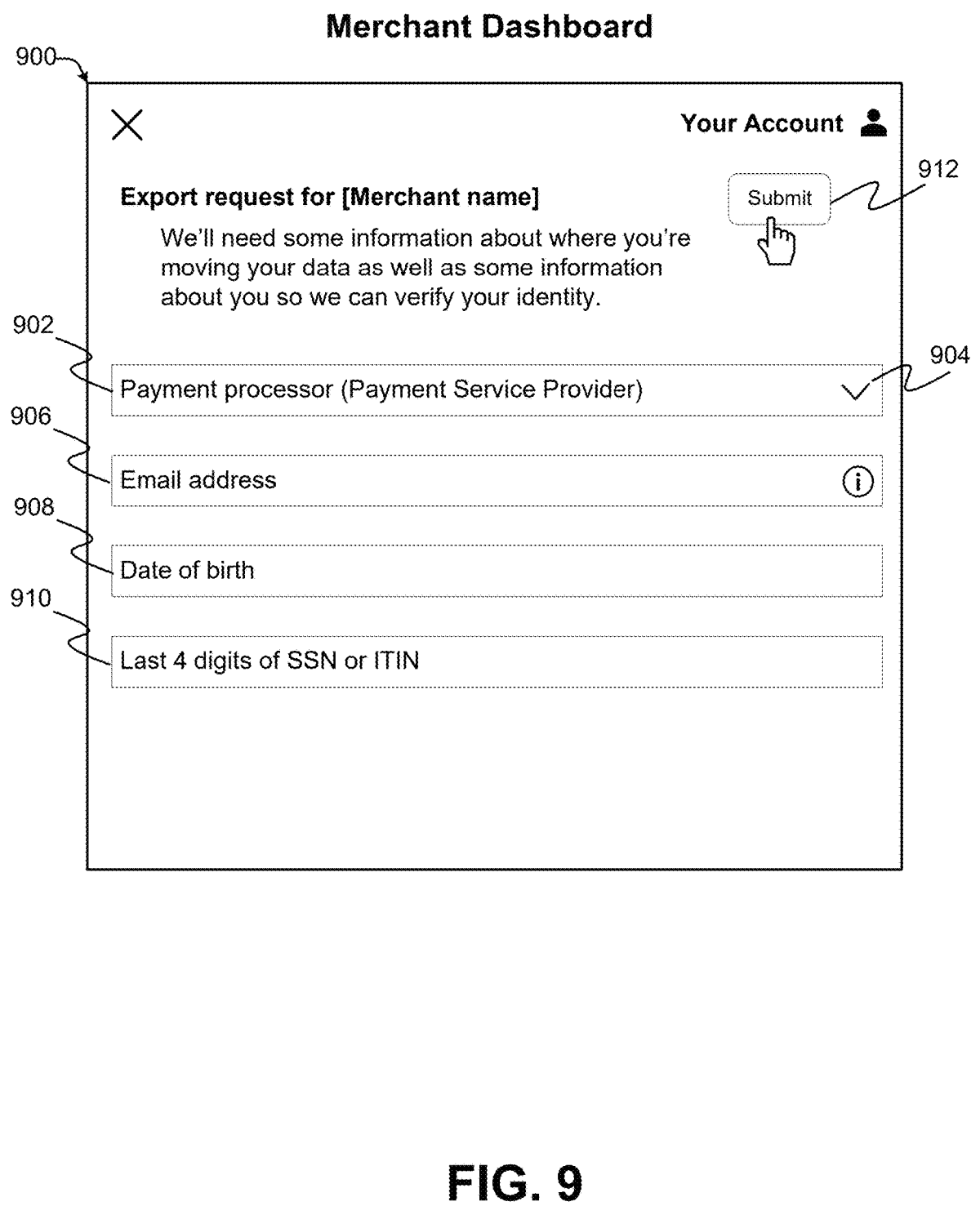

Merchant Dashboard

900

Your Account

Export request for [Merchant name]

Submit

912

We'll need some information about where you're moving your data as well as some information about you so we can verify your identity.

902

Payment processor (Payment Service Provider)

904

906

Email address

908

Date of birth

910

Last 4 digits of SSN or ITIN

FIG. 9

FACILITATING PAYMENTS FOR MERCHANTS THAT USE MULTIPLE PAYMENT SERVICE PROVIDERS

TECHNICAL FIELD

Tokens used for on-file credit cards are payment service provider-agnostic. In closed payment networks, users may grant permission for merchants to use identifiers (e.g., aliases) in association with a particular payment service provider, which means that such permissions are specific to the payment service provider, in contrast to the payment service provider-agnostic tokens used for on-file credit cards.

BRIEF DESCRIPTION OF THE DRAWINGS

Features of the present disclosure, its nature and various advantages, will be more apparent upon consideration of the following detailed description, taken in conjunction with the accompanying drawings.

FIG. 9 is an example user interface of a merchant dashboard accessible to merchants for initiating an export of user payment data to a target PSP, according to an implementation of the present subject matter.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
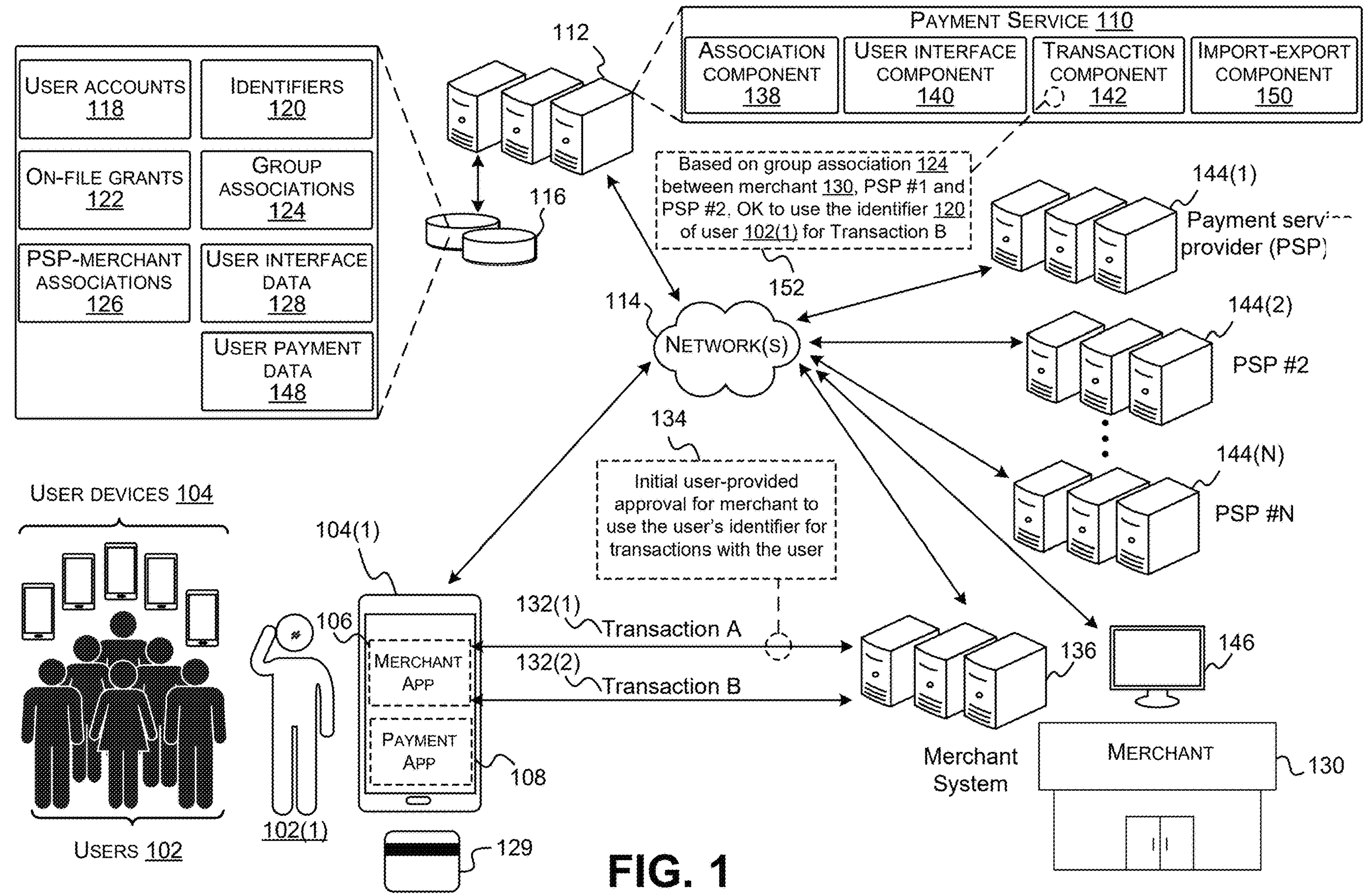
FIG. 1 is an example environment for facilitating payments for merchants that use multiple payment service providers (PSPs), according to an implementation of the present subject matter.

Described herein are, among other things, techniques, devices, and systems for facilitating payments for merchants that use multiple payment service providers (PSPs). To illustrate, merchants may own and/or operate computing devices and/or systems that utilize a payment gateway provided by a PSP in order to process payments for transactions with their customers, such as transactions for items (e.g., goods or services) offered by the merchants for purchase or other means of acquisition. Some merchants may utilize a single PSP, while other merchants, such as large, payment-savvy merchants, may utilize multiple PSPs for various reasons, which are described in more detail below. Furthermore, merchants typically offer their customers the option of using one of multiple different payment methods to make a payment for a transaction. For example, merchants may allow their customers to use a credit card, a debit card, a gift card, and/or the like as a payment method. In the examples described herein, merchants may also collaborate with a payment service that assigns identifiers (e.g., aliases having a particular syntax that can be used as a payment proxy, identifiers of payment instruments issued by a service provider of the payment service, etc.) to users of the payment service. Merchants that collaborate with such a payment service may allow their customers to use these identifiers as yet another type of payment method, wherein the identifiers are useable in lieu of payment data (e.g., credit card data, debit card data, etc.) for paying for transactions between the merchants and their customers. In this latter example, a user who is a customer of a merchant may initially provide input (e.g., via a merchant application associated with the merchant) to establish an on-file grant with the payment service in association with the merchant. The term "on-file grant," as used herein, refers to a stored association between a user, a merchant, and a PSP, and the on-file grant enables the merchant to use the identifier (e.g., alias, service provider-issued payment instrument identifier, etc.) associated with the user to process, via the PSP, payments for future transactions with the user. An on-file grant may be useful, for example, to enable a customer to purchase an item at a brick-and-mortar store without needing to provide another payment instrument at the point of sale, a customer to purchase an item online without having to input their payment information at the point of sale, a customer to establish recurring payments (e.g., for subscriptions) without having to input payment data at the point of each renewal, and/or the like.

The techniques, devices, and systems described herein allow a merchant to submit requests to associate the merchant with one or more new PSPs, even after on-file grants have already been established for the merchant in association with their current PSP(s). For example, upon receiving, from a merchant device of a merchant, a request to associate a new PSP with the merchant, a group association between the merchant, their current PSP(s), and the new PSP may be stored in a data structure(s). In this way, if the customer (mentioned above) initiates a new transaction with the merchant and desires to use their identifier as a payment method for the new transaction, the merchant can use the new PSP to process the new transaction, and, based on the previously-stored group association, the new transaction can be processed using the user's identifier as the payment method without requiring the user to provide an additional input to establish an additional on-file grant for the new PSP in association with the merchant. By allowing a user (e.g., the customer referenced above)—who has already established an on-file grant with a merchant—to continue to use their identifier as a payment method to transact with the merchant without having to provide additional input to re-establish a relationship that they already have with the merchant, a seamless (e.g., interruption free) user experience with the merchant is enabled, regardless of whether the merchant uses multiple PSPs concurrently or transitions from using one PSP to another PSP, and regardless of which PSP the merchant uses to process transactions with the user. With the techniques, devices, and systems described herein, customers of a merchant need not care, or even know, about the particular PSP(s) that a merchant is using for processing payments for transactions with their customers.

Consider an example where a user opens a merchant application, or a web browser to navigate to a web page, associated with a merchant on their user device in order to transact with the merchant. At checkout, the user selects, as a payment method for this first transaction, an identifier associated with their user account with a payment service (the payment service having previously assigned the identifier to the user for making payments using the identifier in lieu of payment data). In this example, if the user is a first time customer of the merchant (or if the user is a returning customer who has not otherwise established an on-file grant in association with the merchant, or whose on-file grant has expired or has been revoked by the user), the user may provide input (e.g., via the merchant application, merchant web page, etc.) to indicate that the merchant is approved to use the identifier to process payments for future transactions between the merchant and the user. This user input may cause a computing device or system associated with the merchant to send a first request to a computing platform associated with the payment service (hereinafter, "payment service computing platform"), the first request indicating a first PSP used by the merchant for processing payments and requesting to establish an on-file grant to enable the merchant to use the identifier to process payments for future transactions. Assuming an on-file grant has not already been established for the user, the merchant, and the first PSP (or, if a previous on-file grant is no longer active due to expiration or revocation), a first on-file grant is established by storing, in a data structure, a first association between the user, the merchant, and the first PSP. At a later time, the merchant may decide to use a second PSP that is different than the first PSP, either as a replacement for the first PSP or as an additional PSP that is to be used concurrently with the first PSP. Accordingly, the merchant may submit, and the payment service computing platform may receive, a request to associate the second PSP with the merchant. In response to this merchant request, a group association between the merchant, the first PSP, and the second PSP may be stored in the data structure. After the group association is stored, the user may decide to transact with the merchant again (e.g., via the merchant application, merchant web page, etc.), and, as a result, the payment service computing platform may receive a second request to use the identifier as a payment method for a second transaction between the user and the merchant, wherein the second request indicates that the second transaction will be processed using the second PSP. At this stage, an on-file grant has not yet been established by the user for the second PSP in association with the merchant and the user involved in the second transaction. Nevertheless, the payment service computing platform may determine, based at least in part on the group association, that the identifier can be used for the second transaction with the merchant. Accordingly, a second on-file grant is established by storing, in the data structure(s), a second association between the user, the merchant, and the second PSP, and the payment service computing platform may send a response to the second request indicating approval to use the identifier for payment of the second transaction. Notably, in some examples, the user is not required to provide an additional input to establish the second on-file grant, thereby avoiding a disruption in processing the payment and providing a seamless user experience of purchasing items (e.g., goods and/or services) from the merchant using the identifier of the user in lieu of payment data, as mentioned above.

The techniques, devices, and systems described herein provide a technical solution to a computer-centric problem. To illustrate, conventional systems that implement a closed payment network may grant permission for merchants to use identifiers (e.g., aliases, service provider-issued payment instrument identifiers, etc.) in association with a particular PSP, which means that such permissions are specific to the PSP and are not PSP-agnostic tokens, similar to the tokens used for on-file credit cards and other conventional payment methods. Accordingly, in conventional systems, users typically have to provide duplicate approvals for a merchant to use their identifier in order to process payments whenever the merchant switches to using a new PSP. The technical solutions to this computer-centric problem, as described herein, provide a tool (e.g., web portal, an application programming interface (API), etc.) that merchants can use to opt-in to "multi-PSP mode" and/or to transition from using a current PSP to using a new PSP, whereby group associations are created and stored to prevent interruptions in a user experience of purchasing items (e.g., goods and/or services) from the merchant using their identifier in lieu of payment data, regardless of whether the merchant uses multiple PSPs concurrently or transitions from using one PSP to another PSP, and regardless of which PSP the merchant uses to process transactions with the user.

In some examples, the techniques, devices, and systems described herein allow for one or more devices to conserve resources with respect to processing resources, memory resources, networking resources, power resources, etc., in the various ways described herein. For example, data storage resources are conserved by avoiding the storage of duplicative data associated with multiple PSPs utilized by a particular merchant to process payments using the identifiers described herein. To illustrate, a payment application associated with the payment service described herein may be configured to present a user interface that indicates one or more merchants that are approved to use an identifier of a user for transactions with the user. In the scenario where a merchant uses multiple PSPs to process payments for transactions with their customers, and notwithstanding the establishment of multiple on-file grants for the user, the merchant, and the multiple PSPs, the techniques, devices, and systems described herein avoid storing duplicative data that would cause the user interface of the payment application to list the same merchant in multiple line items. As another example, processing resources, networking resources, and/or the like are conserved by avoiding the processing of additional approvals from users whenever merchants start using a new PSP.

In some examples, the techniques, devices, and systems described herein provide improved payment security in the context of facilitating payments for merchants that use multiple PSPs. For example, because each on-file grant described herein is specific to a particular PSP used by a merchant, an on-file grant associated with that specific PSP cannot be inadvertently used to process a payment for a transaction using a different PSP, even if the merchant uses the different PSP for other transactions. Moreover, the techniques, devices, and systems described herein enable using an identifier (e.g., alias, service provider-issued payment instrument identifier, etc.) in lieu of payment data to process payments, thereby avoiding the transmission of sensitive payment data over computer networks that may be relatively unsecure, while providing a merchant with more flexibility to use multiple, different PSPs (e.g., for different retail channels, for increased redundancy, increased geographic coverage, and/or better pricing, etc.).

In some examples, the techniques, devices, and systems described herein provide an improved user experience. For example, a merchant can switch to using a different PSP or start using an additional PSP for processing payments for transactions with their customers, and their customers can continue to use their identifiers (e.g., aliases, service provider-issued payment instrument identifiers, etc.) as a payment method to purchase items from the merchant without having to provide additional approvals for the merchant to use their identifiers to process future payments. Moreover, the techniques, devices, and systems described herein account for the potential use of multiple PSPs by a single merchant by avoiding the presentation of duplicate line items in a user interface of a payment application to indicate that the user has approved the merchant to use their identifier for transactions. This, in turn, leads to an improved user experience if and when the user decides to revoke approval of the merchant to use their identifier because the user does not have to provide input, via the payment application, with respect to multiple, duplicate line items to revoke approval for a single merchant.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 is an example environment 100 for facilitating payments for merchants that use multiple PSPs, according to an implementation of the present subject matter. As depicted, the example environment 100 may include users 102, such as the user 102(1). The users 102 may be associated with respective user devices 104 (sometimes referred to herein as "electronic devices"), such as the user device 104(1). The user devices 104 are configured to execute respective applications, such as a merchant application 106, a payment application 108, and/or any other suitable application. In some examples, the payment applications (e.g., the payment application 108) can be provided by a payment service computing platform that implements a payment service 110. The payment applications (e.g., the payment application 108), when executing on the respective user devices 104, may allow the respective users 102 to navigate to the various user interfaces described herein, and/or to interact with or access services, such as the payment service 110. In at least one example, the payment application 108 allows for the efficient transfer of funds (e.g., fiat currency, securities (e.g., stocks, bonds, mutual funds), cryptocurrencies, gift cards, etc.) between users 102 of the payment service 110. Such transfers can be "efficient" in that they can happen electronically, in real-time or near real-time, due to a complex integration of software and hardware components configured to facilitate such transfers. In some examples, the payment application 108 allows two users who are "peers" to transfer funds in a "peer-to-peer (P2P)" transaction. In some examples, the merchant application 106 installed on respective user devices 104 can be different instances of a same merchant application 106, and/or the payment application 108 installed on respective user devices 104 can be different instances of a same payment application 108. For example, the users 102 may download and install a particular version of the merchant application 106 and/or a particular version of the payment application 108 on their user devices 104, either via a first time installation, a software update, or the like.

As depicted by FIG. 1, the user device 104(1) of the user 102(1) may be coupled to one or more servers 112 of the payment service computing platform via one or more network(s) 114, such as a wide area network (WAN) (e.g., the Internet, a cellular network, etc.). Other user devices 104 of other users 102 may be coupled to the server(s) 112 in a similar fashion. In some examples, the payment service computing platform may include a cloud-based computing architecture suitable for hosting and servicing the respective payment applications (e.g., the payment application 108) executing on the respective user devices 104. In particular examples, the payment service computing platform may include a Platform as a Service (PaaS) architecture, a Software as a Service (SaaS) architecture, an Infrastructure as a Service (IaaS) architecture, a Data as a Service (DaaS) architecture, a Compute as a Service (CaaS) architecture, or other similar cloud-based computing architecture (e.g., "X" as a Service (XaaS)). The payment service computing platform may be used to implement the aforementioned payment service 110, as described herein.

A service provider may operate the payment service computing platform, which may include one or more processing devices, such as the aforementioned server(s) 112, and one or more data stores 116. The server(s) 112 (or other types of processing devices) may be configured to provide processing or computing support for the respective payment applications (e.g., the payment application 108) executing on the respective user devices 104. The data store(s) 116 may include, for example, one or more internal data stores that may be utilized to store various types of data including user accounts 118, identifiers 120, on-file grants 122, group associations 124, PSP-merchant associations 126, and/or user interface data 128, among other types of data.

Each user account 118 may be a collection of data representing an identity of a user 102. As users 102 are onboarded to the payment service 110, new user accounts 118 are created for those new users 102. The identifiers 120 are associated with respective user accounts 118 of the users 102, and the identifiers 120 can be used in lieu of payment data for paying for transactions. In some examples, the identifiers 120 are automatically generated by the payment service 110 and assigned to onboarded users 102. In some examples, users 102 may choose or otherwise specify their own identifiers 120. In this latter scenario, the payment service 110 may ensure that a user-specified identifier 120 is unique (e.g., not already taken by another user 102) before it is assigned to a new user 102. In some examples, an individual identifier 120 can be a sequence of alphanumeric letters, numbers, and/or symbols having a particular syntax (e.g., "$JaneSmith"). In this example, the identifier 120 is an alias that can be used as a payment proxy. In some examples, multiple identifiers 120 can be associated with a single user account 118, for example, if a user 102 has multiple personas (e.g., personal user, business user, etc.) or other types of linked sub-accounts or personas. In some examples, the identifiers 120 identify payment instruments that are associated with the payment service 110 and that are issued to a subset of qualifying users 102. For example, a service provider of the payment service 110 may issue a payment instrument 129 (e.g., a debit card, a credit card, etc.) to the users 102 who qualify for the payment instrument(s) 129, and the payment instrument 129 can be used in association with the payment service 110. In FIG. 1, the user 102(1) has been issued the payment instrument 129, and funds available in the user account 118 of the user 102(1) can be used to facilitate transactions that are conducted using that payment instrument 129 (sometimes referred to herein as "card transactions"). In examples where the identifiers 120 identify payment instruments issued by a service provider of the payment service 110, such as the payment instrument 129 issued to the user 102(1), the identifier 120 of the payment instrument 129 may be used as a payment proxy in a similar manner to that described above with respect to an alias.

In some examples, a user 102 can provide input (e.g., via the merchant application 106, via a merchant web page loaded in a web browser, via the payment application 108, etc.) indicating their approval of a merchant 130 to use their identifier 120 (e.g., as a payment method) for transactions with the user 102. In some examples, such user input can be provided in the context of a transaction between the user 102 and the merchant 130, but it is to be appreciated that user-approval of the merchant 130 to use an identifier 120 may occur in other contexts besides a transaction. In the example of FIG. 1, the user 102(1) conducts a first transaction 132(1) ("Transaction A") with the merchant 130, whereby the user 102(1) provides input (e.g., via the merchant application 106) indicating their approval of the merchant 130 to use an identifier 120 associated with a user account 118 of the user 102(1) for transactions, including the transaction 132(1), with the user 102(1). For example, a user interface of the merchant application 106 may ask the user 102(1)—e.g., via a prompt during a checkout process for an item(s) the user 102(1) is/are purchasing from the merchant 130—whether the user 102(1) would like to have the merchant 130 save their identifier "on file" for use in future transactions, and the user 102(1) may provide their approval by selecting an interactive element (e.g., an "approve" button, a "yes" button, etc.) in the user interface of the merchant application 106. In response to this initial user-provided approval 134, the server(s) 112 may receive a first request (e.g., from a merchant system 136 associated with the merchant 130, from the user device 104(1), etc.) to establish a first on-file grant 122.

In the example of FIG. 1, the payment service 110 is shown as including an association component 138, a user interface component 140, a transaction component 142, and/or an import-export component 150. The components 138, 140, 142, and 150, and the payment service 110 itself, may represent computer-executable instructions that, when executed by a processor(s) (e.g., a processor(s) of the server(s) 112) cause performance of one or more operations described herein. Continuing with the running example, the association component 138 may process the first request, and may establish the first on-file grant 122 based at least in part on data extracted from the first request. In some examples, the first request includes data that indicates, among other things, a first payment service provider (PSP) 144(1) ("PSP #1") used by the merchant 130 for processing payments. In some examples, the first request further indicates the merchant 130 and/or the user 102(1) involved in the first transaction 132(1). The first request may indicate the user 102(1), the merchant 130, and/or the first PSP 144(1) in any suitable manner, such as by including, in the first request, respective identifiers that identify the user 102(1), the merchant 130, and/or the first PSP 144(1). In order to establish the first on-file grant 122, the association component 138 may store, in a data structure (e.g., a database maintained in the data store(s) 116), a first association between the user 102(1), the merchant 130, and the first PSP 144(1). An example data structure 600 that may store the first association will be described below with reference to FIG. 6. An individual on-file grant 122 may represent an association (or mapping) between a user 102, a merchant (e.g., the merchant 130), and a PSP (e.g., the first PSP 144(1)). Once established, a first on-file grant 122 enables the merchant 130 to use the identifier 120 associated with the user account 118 of the user 102(1) to process payments, via the first PSP 144(1), for future transactions with the user 102(1), without the user 102(1) having to provide an additional input at the time of the transactions.

At some point, the merchant 130 may decide to use a new PSP 144 that is different than their current PSP 144. There can be many reasons why a merchant 130 decides to use a new PSP 144 for processing payments for transactions with their customers. As an example, a merchant 130 may desire more commercial flexibility by choosing the PSP 144 that offers the best feature set and/or cost for their use case. For example, a merchant 130 may choose to use the first PSP 144(1) ("PSP #1") for a first retail channel (e.g., to process payments for online transactions conducted via the merchant application 106, a web browser, etc.), and the merchant 130 may choose to use a second PSP 144(2) ("PSP #2") for a second retail channel (e.g., to process payments for transactions conducted via a brick-and-mortar points of sale). As another example, a merchant 130 may desire increased redundancy whereby a second PSP 144(2) serves as a payment gateway backup so that transactions can be rerouted to the second PSP 144(2)) in the event that the first PSP 144(1) experiences downtime or other disruptions. As another example, a merchant 130 may desire increased geographic coverage by ensuring that transactions can be routed to a PSP 144 that provides a preferred fee structure, more coverage, and/or better performance in countries where the merchant 130 transacts with customers. As yet another example, a merchant 130 may desire to transition from using the first PSP 144(1) to using the second PSP 144(2) if, say, the second PSP 144(2) offers better pricing and/or a better feature set than the first PSP 144(1), and/or if the second PSP 144(2) offers a faster transaction time, on average, than the first PSP 144(1).

Accordingly, the merchant 130 may use a merchant device(s) 146 to submit, and the payment service computing platform (e.g., the server(s) 112) may receive, a request to associate the second PSP 144(2) with the merchant 130. In some examples, as will be described in more detail below, this request from the merchant 130 may be a request to concurrently use the first PSP 144(1) and the second PSP 144(2) for processing payments using identifiers 120 associated with user accounts 118 of users 102, or a request to transition from using the first PSP 144(1) to using the second PSP 144(2) for processing such payments. In response to this merchant request, a group association 124 between the merchant 130, the first PSP 144(1), and the second PSP 144(2) may be stored in the data structure (e.g., the data structure 600 of FIG. 6). After the group association 124 is stored, the user 102(1) may decide to transact with the merchant 130 again (e.g., via the merchant application 106, via a merchant web page loaded in a web browser, etc.). This is shown in FIG. 1 as a second transaction 132(2) ("Transaction B"). As a result of this second transaction 132(2), the server(s) 112 may receive (e.g., from the merchant system 136, from the user device 104(1), etc.) a second request to use the identifier 120 associated with the user account 118 of the user 102(1) as a payment method for the second transaction 132(2) between the user 102(1) and the merchant 130. If the merchant 130 has chosen to use the second PSP 144(2) to process the second transaction 132(2), the second request indicates that the second transaction 132(2) will be processed using the second PSP 144(2). In some examples, the second request further indicates the merchant 130 and/or the user 102(1) involved in the second transaction 132(2). The second request may indicate the user 102(1), the merchant 130, and/or the second PSP 144(2) in any suitable manner, such as by including, in the second request, respective identifiers that identify the user 102(1), the merchant 130, and/or the second PSP 144(2). At the time that the server(s) 112 receives this second request, an on-file grant 122 has not yet been established for the second PSP 144(2) in association with the merchant 130 and the user 102(1) involved in the second transaction 132(2). Nevertheless, as shown by reference numeral 152 in FIG. 1, the transaction component 142 may determine that the identifier 120 associated with the user account 118 of the user 102(1) can be used for the second transaction 132(2) with the merchant 130 because the transaction component 142 can identify the stored group association 124—which associates the merchant 130, the first PSP 144(1), and the second PSP 144(2). Accordingly, a second on-file grant 122 is established by storing, in the data structure (e.g., the data structure 600 of FIG. 6), a second association between the user 102(1), the merchant 130, and the second PSP 144(2), and the server(s) 112 may send a response to the second request indicating approval to use the identifier 120 associated with the user account 118 of the user 102(1) for payment of the second transaction 132(2). Notably, in some examples, the user 102(1) is not required to provide an additional input to establish the second on-file grant 122, thereby providing a seamless user experience of purchasing items (e.g., goods and/or services) from the merchant 130 using their identifier 120 in lieu of payment data, among other technical benefits, as mentioned above.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
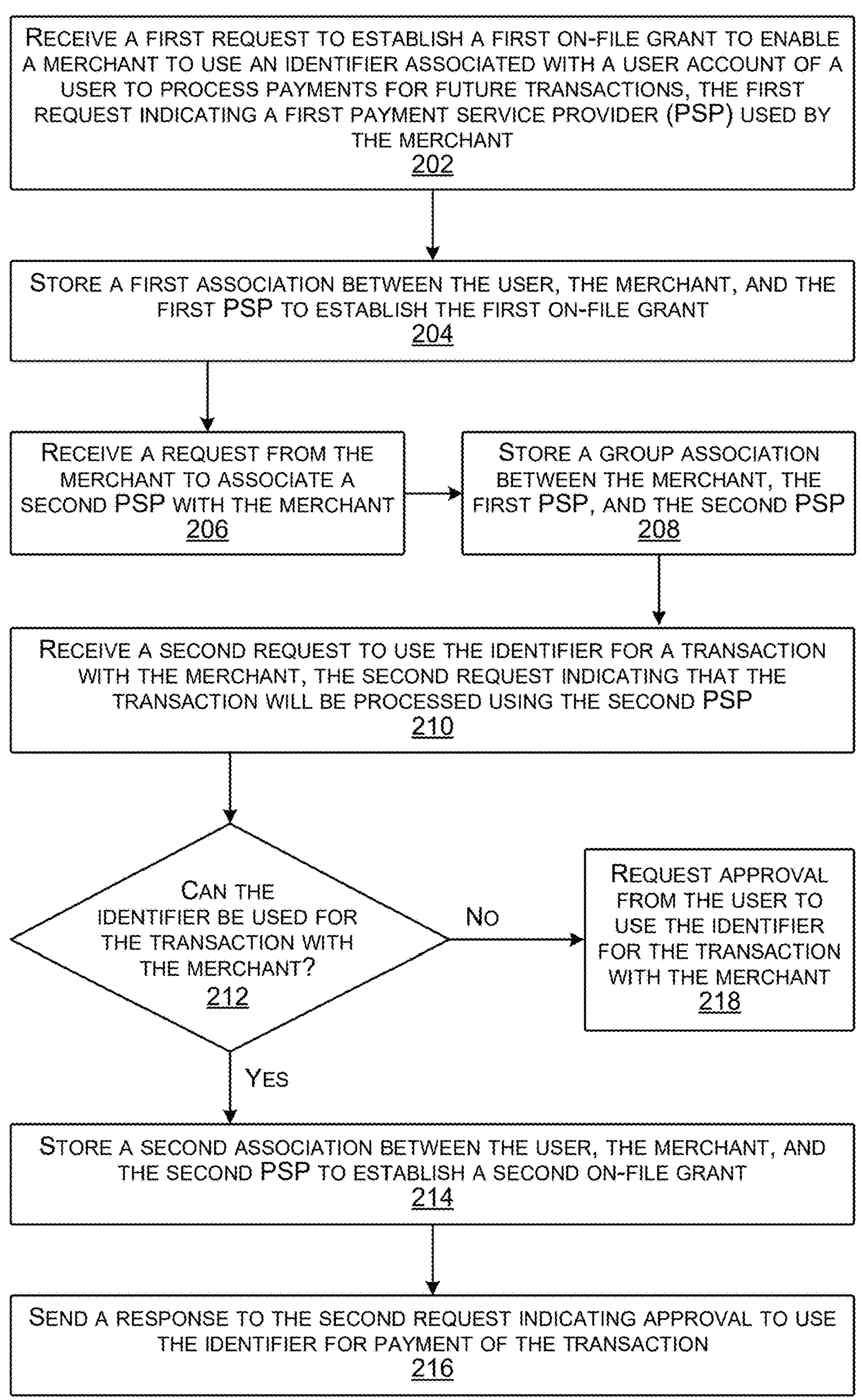
FIG. 2 is an example process for facilitating payments for transactions between a user and a merchant that uses multiple PSPs, according to an implementation of the present subject matter.

FIG. 2 is an example process 200 for facilitating payments for transactions between a user and a merchant that uses multiple PSPs, according to an implementation of the present subject matter. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 200. The process 200 can be implemented by a system including one or more processors and memory storing computer-executable instructions to cause the one or more processors to perform the process 200. In some examples, the process 200 can be implemented by a processing device(s) (e.g., a computing system and/or a server(s) 112 of the payment service computing platform). For discussion purposes, the process 200 is described with reference to the previous figure.

At 202, a first request to establish a first on-file grant 122 to enable a merchant 130 to use an identifier 120 associated with a user account 118 of a user 102 to process payments for future transactions is received. In some examples, the payment service computing platform (e.g., a server(s) 112, the association component 138 and/or the transaction component 142 executing thereon, etc.) may receive the first request at block 202. In some examples, as indicated in block 202, the first request received at block 202 indicates a first PSP 144(1) used by the merchant 130 for processing payments. In some examples, the first request received at block 202 further indicates the merchant 130 and/or the user 102. In some examples, the first request received at block 202 may indicate the user 102, the merchant 130, and/or the first PSP 144(1) in any suitable manner, such as by including, in the first request, respective identifiers that identify the user 102, the merchant 130, and/or the first PSP 144(1). In some examples, the receipt of the first request at block 202 is based on (e.g., in response to) an input provided by the user 102. For example, the user 102 may be interacting with a merchant application 106 associated with the merchant 130, and a user interface of the merchant application 106 may ask the user 102—e.g., via a prompt during a checkout process for an item(s) the user 102 is/are purchasing from the merchant 130—whether the user 102 would like to have the merchant 130 save their identifier "on file" for use in future transactions, and the first request may be received at block 202 based on the user 102 interacting with an interactive element (e.g., an "approve" button, a "yes" button, etc.) in the user interface of the merchant application 106 to provide their approval for the merchant 130 to use their identifier 120 for processing payments in future transactions. In some examples, the first request received is received at block 202 in association with the user 102 completing a first transaction 132(1) with the merchant 130. In some examples, the identifier 120 (e.g., alias, service provider-issued payment instrument identifier, etc.) is to be used in lieu of payment data (e.g., a credit card number, debit card number, bank account number, etc.) for paying for the future transactions.

At 204, a first association between the user 102, the merchant 130, and the first PSP 144(1) is stored in a data structure to establish the first on-file grant 122. In some examples, the payment service computing platform (e.g., the server(s) 112, the association component 138 executing thereon, etc.) may store the first association at block 204. In some examples, storing the first association at block 204 includes creating the first association in the data structure. That is, the first association and/or the first on-file grant 122 may not exist in the data structure prior to block 204, and, in this sense, the first association may be created in the data structure to establish the first on-file grant 122. In some examples, the data structure is maintained in the data store(s) 116. In some examples, the data structure is a relational database, a graph database, a time series database, a multi-model database, an object-oriented database, and/or the like. One example of the data structure is the data structure 600 of FIG. 6, which is described in detail below.

At 206, a request to associate a second PSP 144(2) with the merchant 130 is received from a merchant device 146 of the merchant 130. In some examples, the payment service computing platform (e.g., the server(s) 112, the association component 138 executing thereon, etc.) may receive the request at block 206. In some examples, the request is received at block 206 via a web portal, an API, and/or the like. An example of a web portal accessible to merchants for requesting to associate with one or more new PSPs 144 will be described in more detail below with reference to FIGS. 4A and 4B. In some examples, the request received at block 206 is a request to concurrently use the first PSP 144(1) and the second PSP 144(2) for processing payments using identifiers 120 associated with user accounts 118 of users 102. For example, as will be described in more detail below, the request received at block 206 may be a request to activate, or otherwise opt-in to multi-PSP mode whereby the merchant 130 can concurrently use the first PSP 144(1) and the second PSP 144(2) for processing payments using identifiers 120 associated with user accounts 118 of users 102. In some examples, the request received at block 206 is a request to transition from using the first PSP 144(1) to using the second PSP 144(2) for processing payments using identifiers 120 associated with user accounts 118 of users 102. In examples where the request is a request to transition to using a new PSP 144, one or more migration operations may be performed to ensure that the new PSP 144 obtains existing on-file grants 122 that are associated with the merchant 130 and the current PSP 144 being used by the merchant 130. For example, the server(s) 112 may transfer data to a computing system associated with the second PSP 144(2) based on a request from the merchant 130 to transition from using the first PSP 144(1) to using the second PSP 144(2), wherein the transferred data represents existing on-file grants 122 associated with the merchant 130 and the first PSP 144(1). In this manner, customers of the merchant 130 who had already provided approval for the merchant 130 to user their identifiers 120 to process payments via the first PSP 144(1) do not have to provide additional input indicating their approval for the merchant 130 to use their identifiers 120 to process payments via the second PSP 144(2). It is to be appreciated that, even when a merchant 130 requests to transition from using a first PSP 144(1) to using a second PSP 144(2), there can be a period of time after the submission of the request during which the merchant 130 is concurrently using the first PSP 144(1) and the second PSP 144(2) for processing payments using identifiers 120 associated with user accounts 118 of users 102. This period of time of concurrent usage of multiple PSPs 144 may help to mitigate the impact on the merchant's operations. In other words, the one or more migration operations that are performed to transition from using an existing PSP 144(1) to using a new PSP 144(2) may not be a one-time migration, but rather an initial synchronization between the existing PSP 144(1) and the new PSP 144(2), and once the relationship is established between the merchant 130 and the new PSP 144(2), a batch export of data to the computing system associated with the new PSP 144(2) may commence, but additional transaction-level updates may occur in order to maintain the synchronization between the existing PSP 144(1) and the new PSP 144(2) with respect to the merchant 130 who submitted the request to transition to the new PSP 144(2). In some examples, when the merchant 130 finalizes a migration from an existing PSP 144(1) to a new PSP 144(2), the payment service computing platform (e.g., the server(s) 112) may revoke access from the existing PSP 144(1). Although the example provided above involves a request to associate the second PSP 144(2) with the merchant 130, it is to be appreciated that the request may be to associate one or more of the PSPs 144(2)-144(N) shown in FIG. 1, where N is any suitable integer greater than two. In some examples, the second PSP 144(2) (or any PSP 144 for that matter) is associated with an entity that operates the payment service computing platform (e.g., the server(s) 112). In this example, although FIG. 1 depicts the PSPs 144 as being external to the payment service computing platform (e.g., the server(s) 112), one or more of the PSPs 144 may be an "in-house" PSP 144 that is associated with the same entity that owns and/or operates the payment service computing platform (e.g., the server(s) 112), as opposed to an external (e.g., third-party) PSP 144.

Figure 6:
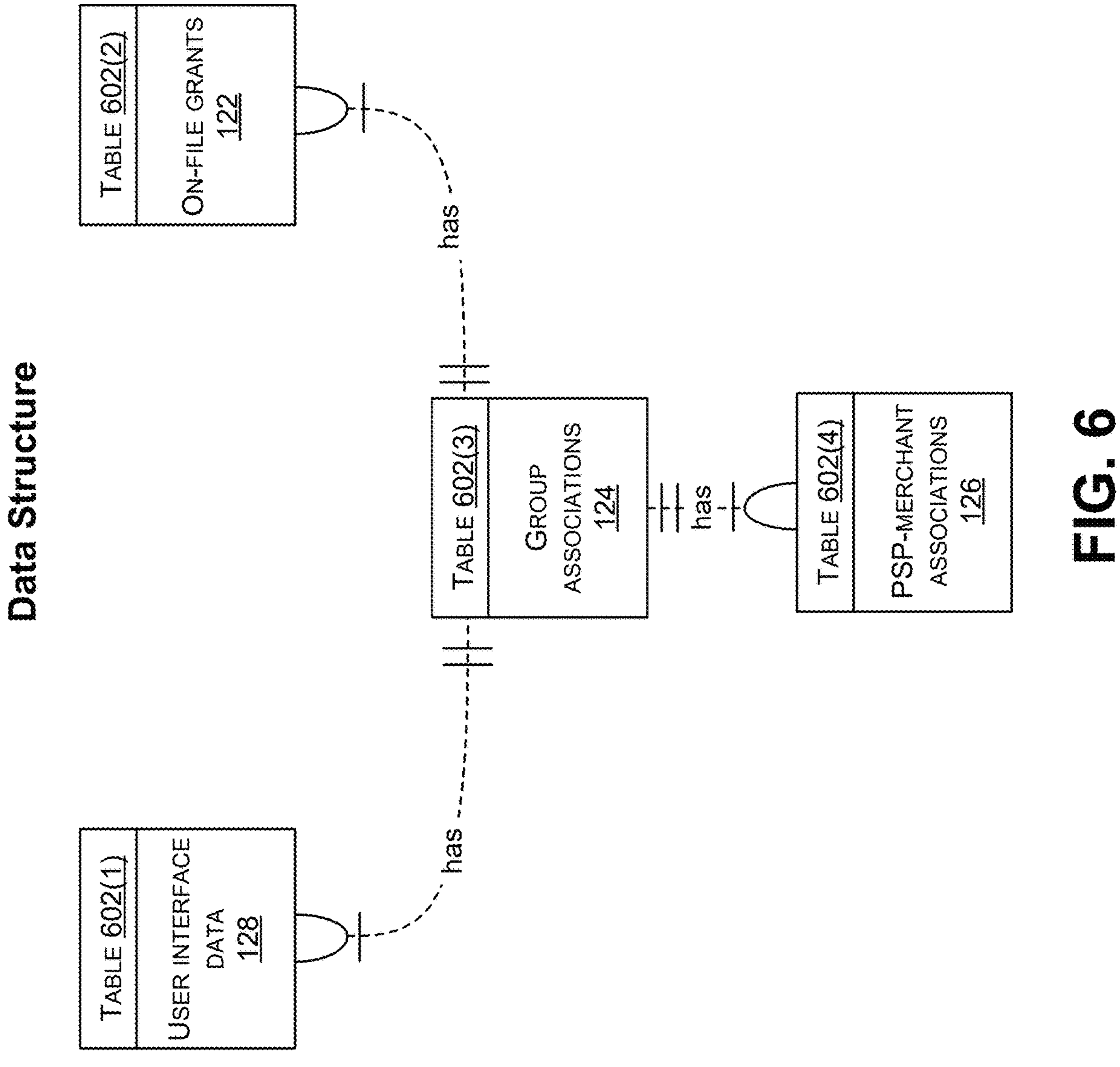
FIG. 6 is a diagram illustrating an example data structure that stores data for facilitating payments for merchants that use multiple PSPs, according to an implementation of the present subject matter.

At 208, a group association 124 between the merchant 130, the first PSP 144(1), and the second PSP 144(2) is stored in the data structure (e.g., the data structure 600 of FIG. 6). In some examples, the payment service computing platform (e.g., the server(s) 112, the association component 138 executing thereon, etc.) may store the group association 124 at block 208. In some examples, storing the group association 124 at block 208 includes creating the group association 124 in the data structure in the sense that the group association 124 may not exist in the data structure prior to block 208. In some examples, the group association

124 enables the identifier 120 associated with the user account 118 of the user 102 to be used for the future transactions without requiring the user 102 to provide an additional input to establish an additional on-file grant 122 to enable the merchant 130 to use the identifier 120 to process payments using the second PSP 144(2), thereby providing a seamless user experience, among other technical benefits, as mentioned above. In examples where the request received from the merchant 130 at block 206 is a request to concurrently use the first PSP 144(1) and the second PSP 144(2) for processing payments using identifiers 120 associated with user accounts 118 of users 102, the group association 124 enables the identifier 120 associated with the user account 118 of the user 102 to be used for the future transactions regardless of whether the merchant 130 uses the first PSP 144(1) or the second PSP 144(2), which provides commercial flexibility for the merchant 130 to use any desired PSP 144 without concern of interruption to the user experience in transacting with the merchant's customers.

At 210, a second request to use the identifier 120 associated with the user account 118 of the user 102 for a transaction with the merchant 130 is received. In some examples, the payment service computing platform (e.g., the server(s) 112, the transaction component 142 executing thereon, etc.) may receive the second request at block 210. In some examples, as indicated in block 210, the second request received at block 210 indicates that the transaction will be processed using the second PSP 144(2). In some examples, the second request received at block 210 further indicates the merchant 130 and/or the user 102. In some examples, the second request received at block 210 may indicate the user 102, the merchant 130, and/or the second PSP 144(2) in any suitable manner, such as by including, in the second request, respective identifiers that identify the user 102, the merchant 130, and/or the second PSP 144(2). In some examples, the second request is received at block 210 in the context of a second transaction 132(2) with the merchant 130, wherein the second transaction occurs after the first transaction 132(1) mentioned above in relation to block 202, by way of example.

At 212, a determination is made as to whether the identifier 120 associated with the user account 118 of the user 102 can be used for the transaction with the merchant 130. In some examples, the payment service computing platform (e.g., the server(s) 112, the transaction component 142 executing thereon, etc.) may determine, at block 212, whether the identifier 120 associated with the user account 118 of the user 102 can be used for the transaction with the merchant 130. In some examples, it may be determined, at block 212, based at least in part on the group association 124, that the identifier 120 associated with the user account 118 of the user 102 can be used for the transaction with the merchant 130. Such a determination can be made at block 212 at least because the group association 124 indicates an association between the merchant 130, the first PSP 144(1), and the second PSP 144(2), and also because the first on-file grant 122—which indicates an association between the user 102, the merchant 130, and the first PSP 144(1)—is already established, thereby allowing the transaction component 142 to infer an approval from the user 102 for the merchant 130 to use the identifier 120 to process a payment for the transaction using the second PSP 144(2). Accordingly, if it is determined, at block 212, that the identifier 120 associated with the user account 118 of the user 102 can be used for the transaction with the merchant 130, the process 200 may follow the YES route from block 212 to block 214.

At 214, a second association between the user 102, the merchant 130, and the second PSP 144(2) is stored in the data structure (e.g., the data structure 600 of FIG. 6) to establish a second on-file grant 122. In some examples, the payment service computing platform (e.g., the server(s) 112, the association component 138 executing thereon, etc.) may store the second association at block 214. In some examples, storing the second association at block 214 includes creating the second association in the data structure in the sense that the second association may not exist in the data structure prior to block 214. In some examples, the second on-file grant 122 can be established based at least in part on the first on-file grant 122 established at block 204. For example, in conjunction with the storage (e.g., creation) of the group association 124 at block 208, multiple PSP-merchant association 126 may be created, wherein the multiple PSP-merchant associations 126 include a first PSP-merchant association 126 that associates the merchant 130 and the first PSP 144(1), and a second PSP-merchant association 126 that associates the merchant 130 and the second PSP 144(2). In this example, the first PSP-merchant association 126 may have a flag that, when enabled, causes multiple on-file grants 122 to be established in response to receiving approval from a user 102 for the merchant 130 to use the identifier 120 of the user 102 for processing payments using either the first PSP 144(1) or the second PSP 144(2). That is, if the user 102 approves the merchant 130 to use their identifier 120 for a transaction whereby payment for the transaction is to be processed using the first PSP 144(1), two on-file grants 122 may be established based at least in part on a flag that is enabled for the first PSP-merchant association 126, wherein the two on-file grants 122 include a first on-file grant 122 associating the user 102, the merchant 130, and the first PSP 144(1), and a second on-file grant 122 associating the user 102, the merchant 130, and the second PSP 144(2). In some examples, a webhook can be delivered to the second PSP 144(2) in this example to notify the second PSP 144(2) about the establishment of the second on-file grant 122.

At 216, a response to the second request is sent, the response indicating approval to use the identifier 120 for payment of the transaction. In some examples, the payment service computing platform (e.g., the server(s) 112, the transaction component 142 executing thereon, etc.) may send the response at block 216. In some examples, the response sent at block 216 may be sent to the merchant system 136 and/or the merchant device 146 associated with the merchant 130. In some examples, the response sent at block 216 may be sent to the user device 104 of the user 102, and the response may be processed by the merchant application 106 executing on the user device 104.

Returning to block 212, if it is determined that the identifier 120 associated with the user account 118 of the user 102 cannot be used for the transaction with the merchant 130, the process 200 may follow the NO route from block 212 to block 218 where the transaction component 142 may request approval from the user 102 to use the identifier 120 associated with the user account 118 of the user 102 for the transaction with the merchant 130. If, for instance, the group association 124 stored at block 208 is rendered invalid for any reason, such as due to corruption of the data, and/or if the first on-file grant 122 is revoked by the user 102 at a time between blocks 204 and 210, the user 102 may have to provide an additional input to establish an additional on-file grant 122 to enable the merchant 130 to use the identifier 120 for the transaction with the merchant 130.

Example user interfaces will now be described with reference to FIGS. 3A, 3C, 4A, 4B, and 9. Example processes associated with some of these example user interfaces will also be described with reference to FIGS. 3B, 3D, and 5.

Figures 3A, 3B:
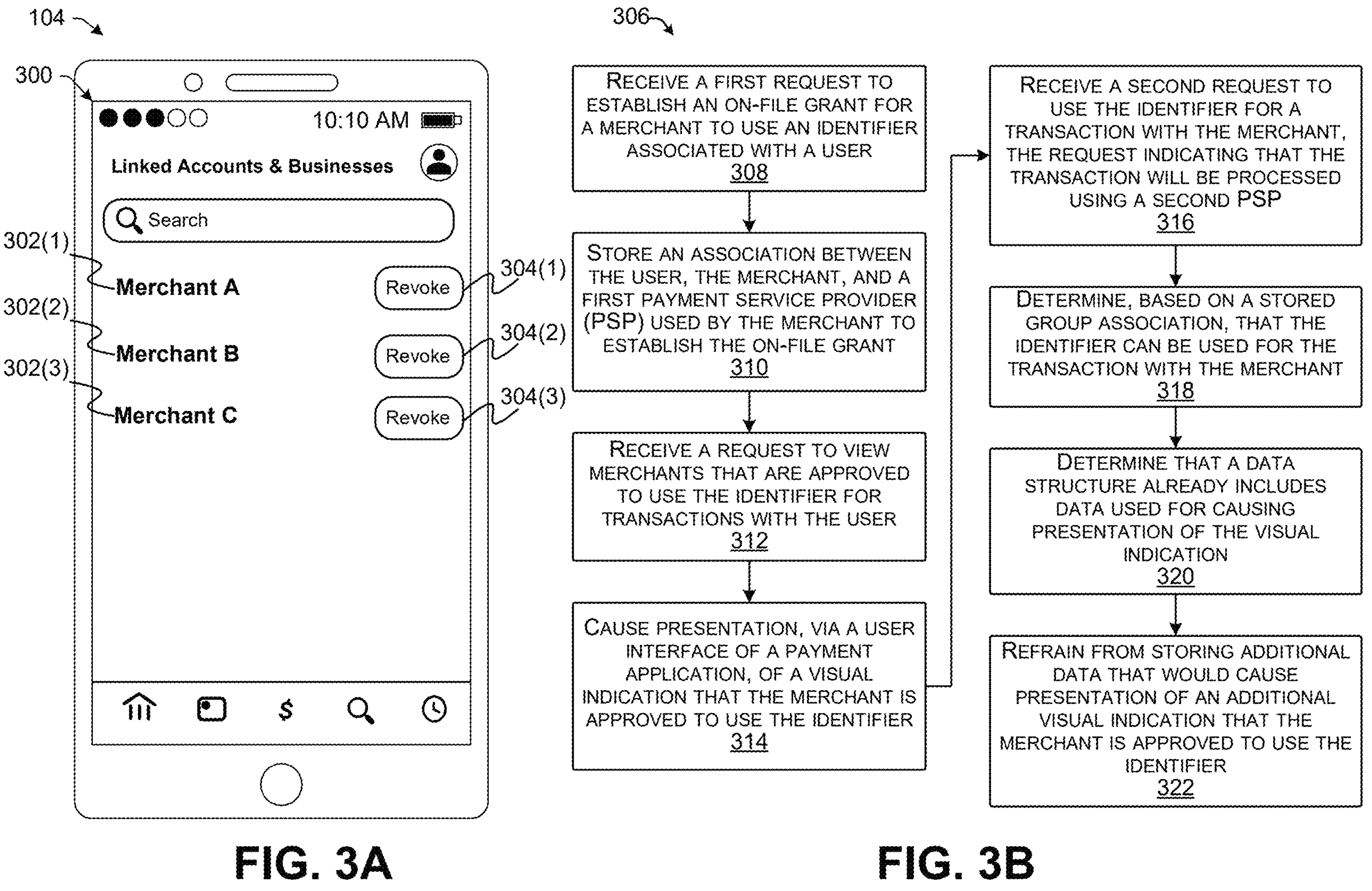
FIG. 3A is an example user interface of a payment application executing on a user device of a user, the user interface presenting one or more visual indications that a merchant(s) is/are approved to use an identifier associated with a user account of the user for transactions with the user, according to an implementation of the present subject matter.
FIG. 3B is an example process for causing presentation, via the user interface of FIG. 3A, of a visual indication that a particular merchant is approved to use the identifier for transactions with the user, and for ensuring that the user interface does not present duplicate line items for the same merchant, according to an implementation of the present subject matter.

In general, the respective users 102 introduced in FIG. 1 can interact with user interfaces of the payment application 108 to, among other things, view one or more merchants (e.g., the merchant 130) that are approved to use the respective identifiers 120 of the users 102 for respective transactions with the users 102, and/or to revoke approval of a particular merchant(s) to use the identifiers 120. FIG. 3A is an example user interface 300 (e.g., graphical user interface) of the payment application 108 executing on a user device 104 of a user 102, the user interface 300 presenting one or more visual indications 302 that corresponding merchants are approved to use an identifier 120 associated with a user account 118 of the user 102 for transactions with the user 102, according to an implementation of the present subject matter. The user interface 300 may be displayed at any suitable time, such as in response to the user 102 opening the payment application 108 and interacting with (e.g., selecting) an interactive element to view the user interface 300 (e.g., a "Linked Accounts & Businesses" user interface). In the example of FIG. 3A, the user interface 300 presents three visual indications 302(1), 302(2), and 302(3) in three line items of the user interface 300, although it is to be appreciated that fewer or greater than three visual indications 302 can be presented in the user interface 300, depending on the number of merchants that the user 102 has approved to use their identifier 120 for transactions with the user 102. Accordingly, the example of FIG. 3A indicates, via the visual indications 302(1)-(3), that the user 102 has approved three different merchants to use their identifier 120 for transactions with the user 102. The user 102 may have provided such approval for each merchant in a similar manner to that described above with respect to FIG. 1 (e.g., the initial user-provided approval 134 described above). In some examples, the user interface 300 further presents one or more interactive element 304 (e.g., a "Revoke" button(s)) that, when interacted with (e.g., selected), causes the payment application 108 to send, to the server(s) 112, a request to revoke approval of the corresponding merchant to use the identifier 120 of the user 102 for transactions with the user 102. An example process associated with such a revocation request is described below with reference to FIG. 3D.

FIG. 3B is an example process 306 for causing presentation, via the user interface 300 of FIG. 3A, of a visual indication 302 that a particular merchant is approved to use the identifier 120 associated with the user account 118 of the user 102 for transactions with the user 102, and for ensuring that the user interface 300 does not present duplicate line items for the same merchant, according to an implementation of the present subject matter. The process 306 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 306. The process 306 can be implemented by a system including one or more processors and memory storing computer-executable instructions to cause the one or more processors to perform the process 306. In some examples, the process 306 can be implemented by a processing device(s) (e.g., a computing system and/or a server(s) 112 of the payment service computing platform). For discussion purposes, the process 306 is described with reference to the previous figures.

At 308, a first request to establish a first on-file grant 122 to enable a merchant 130 to use an identifier 120 associated with a user account 118 of a user 102 to process payments for future transactions is received. In some examples, the payment service computing platform (e.g., a server(s) 112, the association component 138 and/or the transaction component 142 executing thereon, etc.) may receive the first request at block 308. In some examples, the first request received at block 308 may be similar to the first request received at block 202 of the process 200, which is described above. For example, the first request received at block 308 may indicate, among other things, a first PSP 144(1) used by the merchant 130 for processing payments.

At 310, an association between the user 102, the merchant 130, and the first PSP 144(1) is stored in a data structure to establish the first on-file grant 122. In some examples, the payment service computing platform (e.g., the server(s) 112, the association component 138 executing thereon, etc.) may store the first association at block 310. In some examples, storing the first association at block 310 includes creating the first association in the data structure in the sense that the first association may not exist in the data structure prior to block 310. In some examples, the data structure is maintained in the data store(s) 116. In some examples, the data structure is a relational database, a graph database, a time series database, a multi-model database, an object-oriented database, and/or the like.

At 312, a request to view one or more merchants that are approved to use the identifier 120 associated with the user account 118 of the user 102 for transactions with the user 102 is received. In some examples, the payment service computing platform (e.g., the server(s) 112, the user interface component 140 executing thereon, etc.) may receive the request at block 312. In some examples, the request is received at block 312 in response to the user 102 opening the payment application 108 and subsequently interacting with (e.g., selecting) an interactive element to view the user interface 300 (e.g., a "Linked Accounts & Businesses" user interface).

At 314, in response to receiving the request at block 312 and/or in response to storing the association at block 310 to establish the first on-file grant 122, a visual indication 302 is caused to be presented via the user interface 300 of the payment application 108 executing on the user device 104 of the user 102. In some examples, the payment service computing platform (e.g., the server(s) 112, the user interface component 140 executing thereon, etc.) may cause the presentation of the visual indication 302 at block 314. In some examples, as indicated in block 314, the visual indication 302 may indicate that the merchant is approved to use the identifier 120 associated with the user account 118 of the user 102 for transactions with the user 102. Consider an example where the merchant 130 depicted in FIG. 1 corresponds to "Merchant C" in the user interface 300 of FIG. 3A. In this example, the user interface component 140 may cause presentation of the visual indication 302(3) that the merchant 130 is approved to use the identifier 120 associated with the user account 118 of the user 102 for transactions with the user 102.

At 316, a second request to use the identifier 120 associated with the user account 118 of the user 102 for a transaction with the merchant 130 is received. In some examples, the payment service computing platform (e.g., the server(s) 112, the transaction component 142 executing thereon, etc.) may receive the second request at block 316. In some examples, the second request received at block 316 may be similar to the second request received at block 210 of the process 200, which is described above. For example, as indicated in block 316, the second request received at block 316 indicates that the transaction will be processed using the second PSP 144(2).

At 318, a determination is made, based at least in part on a stored group association 124, that the identifier 120 associated with the user account 118 of the user 102 can be used for the transaction with the merchant 130. In some examples, the payment service computing platform (e.g., the server(s) 112, the transaction component 142 executing thereon, etc.) may determine, at block 318, that the identifier 120 associated with the user account 118 of the user 102 can be used for the transaction with the merchant 130. In some examples, the determination made at block 318 may be similar to the determination made at block 212 of the process 200, which is described above. For example, the stored group association 124 may indicate an association between the merchant 130, the first PSP 144(1), and the second PSP 144(2).

At 320, in response to determining, at block 318, that the identifier 120 associated with the user account 118 of the user 102 can be used for the transaction with the merchant 130, a determination is made that the data structure includes data (e.g., user interface data 128) used for causing the presentation, via the payment application 108 executing on the user device 104, of the visual indication 302(3) that the merchant 130 is approved to use the identifier 120 associated with the user account 118 of the user 102 for transactions with the user 102. In some examples, the payment service computing platform (e.g., the server(s) 112, the user interface component 140 executing thereon, etc.) may make the determination at block 320.

At 322, based at least in part on determining, at block 320, that the data structure includes the data (e.g., the user interface data 128), additional data (e.g., additional user interface data 128) that would cause presentation, via the user interface 300, of an additional visual indication 302 that the merchant 130 is approved to use the identifier 120 for transactions with the user 102 is refrained from being stored in the data structure. In some examples, the payment service computing platform (e.g., the server(s) 112, the user interface component 140 executing thereon, etc.) refrains from storing the additional data at block 322. Accordingly, implementation of the process 306 avoids the presentation of duplicate line items in the user interface 300 of the payment application 108 to indicate that the user 102 has approved the merchant 130 to use their identifier 120 for transactions. This, in turn, leads to an improved user experience if and when the user 102 decides to revoke approval of the merchant 130 to use their identifier 120 because the user 102 does not have to provide input, via the payment application 108, with respect to multiple duplicate line items in the user interface 300 to revoke approval for a single merchant, such as the merchant 130 (e.g., "Merchant C"). This improved user experience with respect to a revocation of approval of a particular merchant 130 to use an identifier 120 is described in detail below with respect to FIGS. 3C and 3D.

Figure 3D:
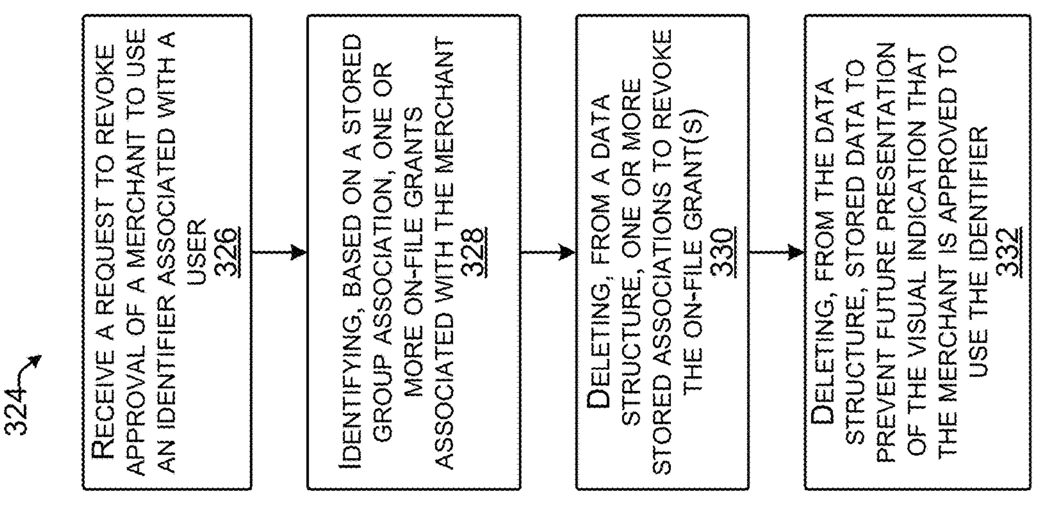
FIG. 3D is an example process for deleting stored data from a data structure to revoke approval of a particular merchant to use the identifier for transactions with the user, and for preventing future presentation, via the user interface of FIG. 3C, of the visual indication that the particular merchant is approved to use the identifier for transactions with the user, according to an implementation of the present subject matter.
Figure 3C:
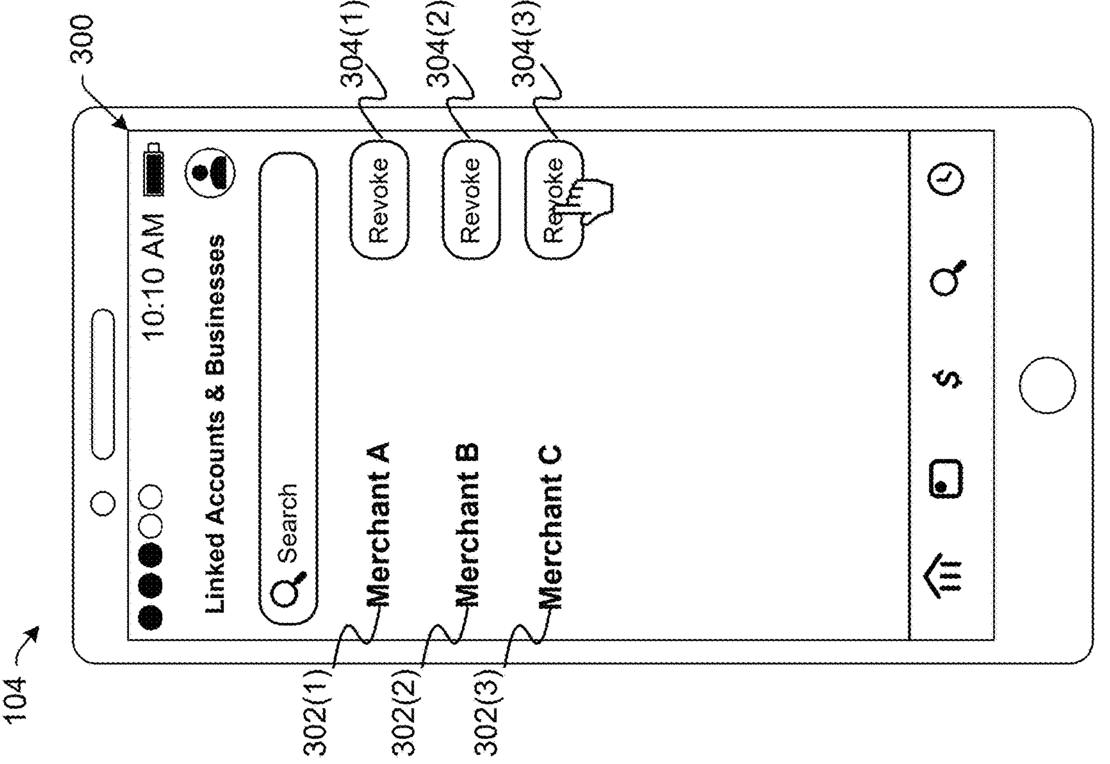
FIG. 3C is the example user interface of FIG. 3A, FIG. 3C further illustrating a scenario where the user interacts with an interactive element for revoking approval of a particular merchant to use an identifier associated with a user account of the user for transactions with the user, according to an implementation of the present subject matter.

FIG. 3C is the example user interface 300 of FIG. 3A. FIG. 3C illustrates a scenario where the user 102 interacts with an interactive element 304(3) for revoking approval of a particular merchant 130 (e.g., "Merchant C") to use an identifier 120 associated with a user account 118 of the user 102 for transactions with the user 102, according to an implementation of the present subject matter. For example, the user 102 may decide, at some point in time, that they no longer want a previously approved merchant 130 (e.g., "Merchant C") to use their identifier 120 for transactions with the user 102, unless and until the user 102 decides to provide explicit approval again, at some later time, for the merchant 130 to do so. In order to revoke approval of the merchant 130 (e.g., "Merchant C"), the user 102 may interact with (e.g., select) the interactive element 304(3) (e.g., a "Revoke" button(s)) for the line item associated with Merchant C in the user interface 300, as shown in FIG. 3C.

FIG. 3D is an example process 324 for deleting stored data to revoke approval of a particular merchant 130 (e.g., "Merchant C") to use the identifier 120 associated with the user account 118 of the user 102 for transactions with the user 102, and for preventing future presentation, via the user interface 300, of the visual indication 302(3) that the particular merchant 130 (e.g., "Merchant C") is approved to use the identifier 120 for transactions with the user 102, according to an implementation of the present subject matter. The process 324 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 324. The process 324 can be implemented by a system including one or more processors and memory storing computer-executable instructions to cause the one or more processors to perform the process 324. In some examples, the process 324 can be implemented by a processing device(s) (e.g., a computing system and/or a server(s) 112 of the payment service computing platform). For discussion purposes, the process 324 is described with reference to the previous figures.

At 326, a request to revoke approval of a merchant 130 to use an identifier 120 associated with a user account 118 of a user 102 for transactions with the user 102 is received. In some examples, the payment service computing platform (e.g., the server(s) 112, the user interface component 140 executing thereon, etc.) may receive the request at block 326. In some examples, the request is received at block 326 based on user input provided via the user interface 300 in association with a visual indication 302(3) that the merchant 130 (e.g., "Merchant C") is approved to use the identifier 120 for transactions with the user 102. For example, the revocation request may be received at block 326 in response to the user 102 interacting with (e.g., selecting) the interactive element 304(3) (e.g., a "Revoke" button(s)) for the line item associated with visual indication 320(3) for Merchant C in the user interface 300.

At 328, one or more on-file grants 122 associated with the merchant 130 (e.g., "Merchant C") are identified based at least in part on a stored group association 124. In some examples, the payment service computing platform (e.g., the server(s) 112, the association component 138 executing thereon, etc.) may identify the on-file grant(s) 122 at block 328. In some examples, the stored group association 124 may indicate an association between the merchant 130, a first PSP 144(1), and a second PSP 144(2), and the on-file grants 122 identified at block 328 may include a first on-file grant 122 indicating a first association between the user 102, the merchant 130, and the first PSP 144(1), and a second on-file grant 122 indicating a second association between the user 102, the merchant 130, and the second PSP 144(2).

At 330, one or more stored associations are deleted from a data structure to revoke the identified on-file grant(s). In some examples, the payment service computing platform (e.g., the server(s) 112, the association component 138 executing thereon, etc.) may delete the one or more stored associations at block 330. In the running example, if the association component 138 identifies, at block 328, the first association corresponding to the first on-file grant 122 and the second association corresponding to the second on-file grant 122, the association component 138 may delete the first association and the second association from the data structure to revoke the first on-file grant 122 and the second on-file grant 122. In some examples, the data structure is maintained in the data store(s) 116. In some examples, the data structure is a relational database, a graph database, a time series database, a multi-model database, an object-oriented database, and/or the like.

At 332, stored data (e.g., user interface data 128) is deleted from the data structure to prevent future presentation, via the payment application 108 executing on the user device 104 (e.g., via the user interface 300), of the visual indication 302(3) that the merchant 130 is approved to use the identifier 120 associated with the user account 118 of the user 102 for transactions with the user 102. In some examples, the payment service computing platform (e.g., the server(s) 112, the user interface component 140 executing thereon, etc.) may delete the stored data (e.g., user interface data 128) at block 332. In the running example, deletion of the stored data (e.g., user interface data 128) at block 332 may cause the visual indication 302(3) associated with Merchant C to disappear from the user interface 300, thereby indicating to the user 102 that Merchant C is no longer approved to use their identifier 120 for transactions with the user 102. As mentioned above, because the techniques, devices, and systems describe herein present a single line item (as opposed to duplicate line items) in the user interface 300 of the payment application 108 to indicate that the user 102 has approved a merchant 130 (e.g., "Merchant C") to use their identifier 120 for transactions, this leads to an improved user experience when the user 102 decides to revoke approval of the merchant 130 to use their identifier 120 because the user 102 does not have to provide input, via the payment application 108, with respect to multiple duplicate line items to revoke approval for a single merchant 130. Rather, the user 102 simply revokes approval of the merchant 130 (e.g., "Merchant C") through interacting with a single interactive element 304(3) in the user interface 300, notwithstanding a scenario where the merchant 130 uses multiple PSPs 144 (e.g., the first PSP 144(1), the second PSP 144(2), and possibly one or more additional PSPs 144) for processing payments.

Figure 4A:
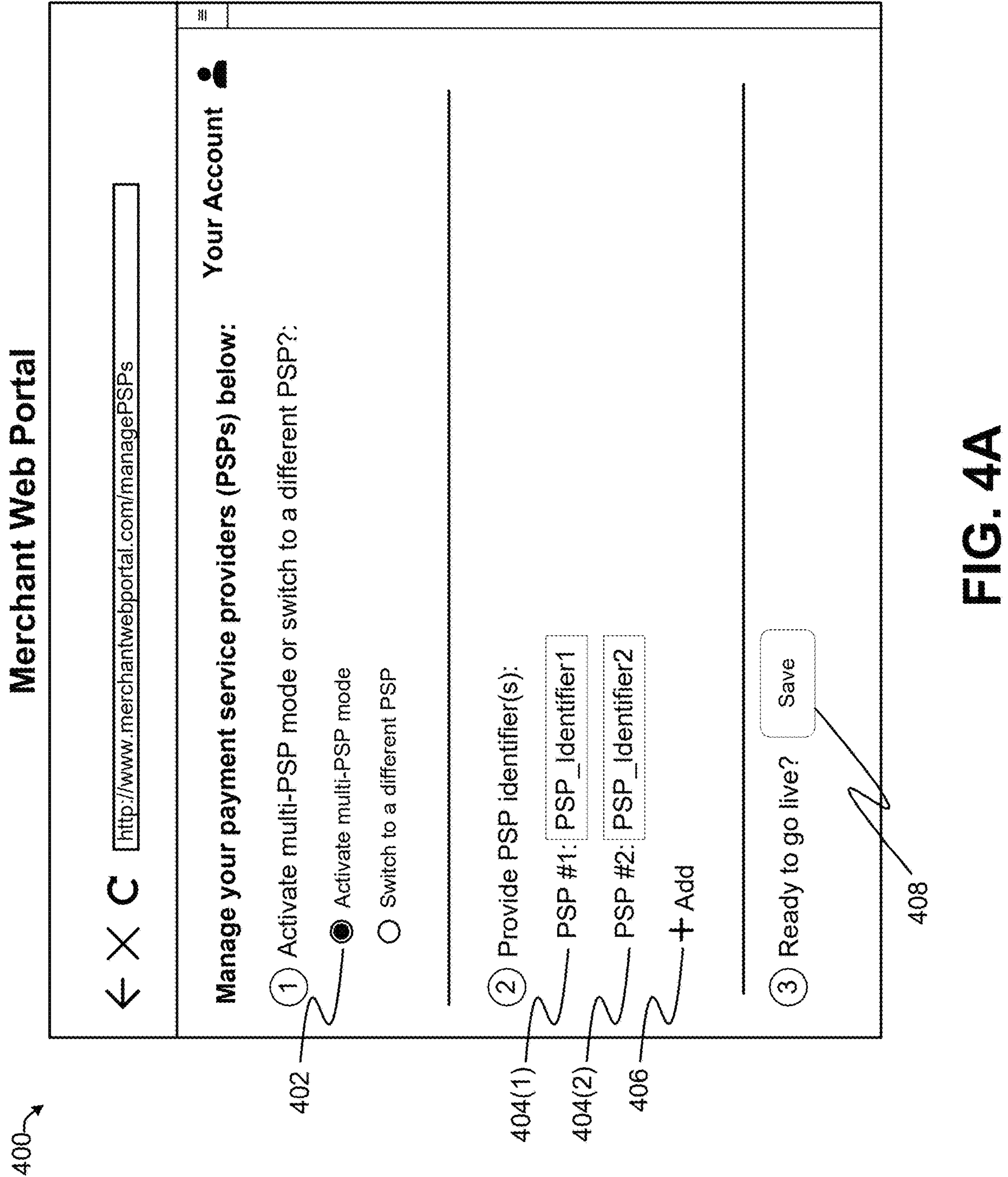
FIG. 4A is an example user interface of a web portal accessible to merchants for requesting to associate with one or more new PSPs so that the new PSP(s) can be used by the merchant for processing payments for future transactions with users using identifiers associated with user accounts of the users, the user interface of FIG. 4A illustrating a scenario where a merchant has selected an option to activate multi-PSP mode, according to an implementation of the present subject matter.

FIG. 4A is an example user interface 400 of a web portal accessible to merchants for requesting to associate with one or more new PSPs 144 so that the new PSP(s) 144 can be used by the merchant for processing payments for future transactions with users 102 using identifiers 120 associated with user accounts 118 of the users 102. Although he user interface 400 is illustrated as being a user interface of a web browser, it is to be appreciated that the user interface 400 may be a user interface of an application (e.g., a mobile application). In either case, the user interface 400 may be presented on a display of a merchant device 146 associated with a merchant 130. The web portal of FIG. 4A is an example of a tool that merchants can use to opt-in to "multi-PSP mode" and/or to transition from using a current PSP 144 to using a new PSP 144, whereby group associations 124 are created and stored to prevent interruptions in a user experience of purchasing items (e.g., goods and/or services) from the merchant using their identifier 120 in lieu of payment data, regardless of whether the merchant uses multiple PSPs 144 concurrently or transitions from using one PSP 144 to another PSP 144, and regardless of which PSP 144 the merchant uses to process transactions with a given user 102.

The user interface 400 of FIG. 4A illustrates a scenario where a merchant (e.g., the merchant 130) has selected an option 402 to activate multi-PSP mode, according to an implementation of the present subject matter. That is, the merchant 130 may already use a first PSP 144(1) to process payments for transactions with their customers, and the merchant 130 may utilize the web portal to add one or more new PSPs 144(2)-144(N) that they plan to use for processing payments for transactions with their customers. In an example, the merchant 130, at a time of accessing the web portal, may exclusively use the first PSP 144(1) across all of the merchant's retail channels (e.g., online transactions, brick-and-mortar point of sale transactions, etc.), and the merchant 130 may intend to use the web portal to add a second PSP 144(2), whereby the first PSP 144(1) will be used for a first retail channel (e.g., to process payments for online transactions conducted via the merchant application 106, a web browser, etc.), and the second PSP 144(2) for a second retail channel (e.g., to process payments for transactions conducted via a brick-and-mortar points of sale), In this example, upon selecting the option 402 to activate multi-PSP mode, the merchant 130 may enter a first identifier of the first PSP 144(1) into a first field 404(1) of the user interface 400, and a second identifier of the second PSP 144(2) into a second field 404(2) of the user interface 400. These identifiers may be known to the merchant 130 before accessing the web portal. In some examples, the identifiers entered into the fields 404 may be the company names of the PSPs 144, and the association component 138 may determine the PSPs from the company names. If the merchant 130 would like to add another PSP 144 (e.g., PSP(N)) that they plan to utilize concurrently with the first and second PSPs 144(1) and 144(2), the merchant 130 may select the "+ Add" element in the user interface 400, and the user interface 400 may dynamically add another field 404 to receive an identifier of the additional PSP 144(N). It is to be appreciated that any number of PSPs may be added by the merchant 130, although, in some implementations, there may be a practical limit to the number of PSPs 144 that a merchant can add through the web portal.

Once the merchant 130 is satisfied with the PSPs 144 they have selected or otherwise specified via the web portal, the merchant 130 may interact with (e.g., select) an interactive element 408 (e.g., a "Save" button) to save the entered information and/or activate the multi-PSP mode so that the merchant 130 can start using the new PSP(s) 144 without interruption in a user experience of purchasing items (e.g., goods and/or services) from the merchant 130 using identifiers 120 associated with user accounts 118 of users 102 in lieu of payment data, regardless of which PSP 144 the merchant 130 uses to process transactions with a given user 102. For example, after adding the second PSP 144(2) via the web portal, users 102 who have already approved the merchant 130 to use their identifiers 120 to process payments via the first PSP 144(1) for transactions with the users 102 are not required to provide an additional input to establish an additional on-file grant 122 to enable the merchant 130 to use their identifiers to process payments using the second PSP 144(2).

Figure 4B:
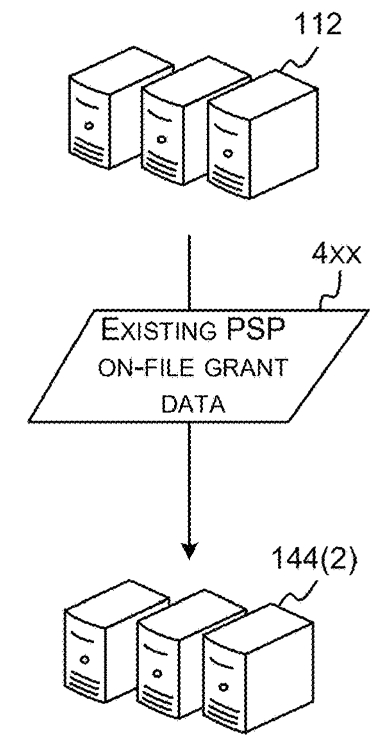
FIG. 4B is the example user interface of the web portal depicted in FIG. 4A, the user interface of FIG. 4B illustrating a scenario where a merchant has selected an option for transitioning to using a PSP that is different than their current PSP for processing payments using identifiers associated with user accounts of users, according to an implementation of the present subject matter.

FIG. 4B is the example user interface 400 of the web portal depicted in FIG. 4A, the user interface 400 of FIG. 4B illustrating a scenario where a merchant 130 has selected an option 410 for transitioning to using a different PSP 144 than their current PSP 144 for processing payments using identifiers 120 associated with user accounts 118 of users 102, according to an implementation of the present subject matter. In the example scenario of FIG. 4B, upon selecting the option 410 to transition PSPs 144, the merchant 130 may enter an identifier of the new/target PSP 144 into a field 404 of the user interface 400. This identifier could be a company name of the new/target PSP 144 and/or any other suitable identifier. Once the merchant 130 is satisfied with the PSP 144 they have selected or otherwise specified via the web portal, the merchant 130 may interact with (e.g., select) the interactive element 408 (e.g., the "Save" button) to save the entered information and/or transition to using the new/target PSP 144 without interruption in a user experience of purchasing items (e.g., goods and/or services) from the merchant 130 using identifiers 120 associated with user accounts 118 of users 102 in lieu of payment data, even though there are no established on-file grants 122 associated with the new/target PSP 144 and the users 102 who have already approved the merchant 130 to use their identifiers 120 for transactions with the users 102. That is, users 102 who have already approved the merchant 130 to use their identifiers 120 to process payments via a first PSP 144(1) for transactions with the users 102 are not required to provide an additional input to establish an additional on-file grant 122 to enable the merchant 130 to use their identifiers to process payments using the new/target PSP 144, such as the second PSP 144(2).

FIG. 4B further illustrates a migration operation that may be performed to ensure that the new/target PSP 144 (e.g., the second PSP 144(2)) obtains existing on-file grants 122 that are associated with the merchant 130 and the current PSP 144 (e.g., the first PSP 144(1)) being used by the merchant 130. For example, the server(s) 112 may transfer data to a computing system associated with the second PSP 144(2) based on a request from the merchant 130 (e.g., submitted via the user interface 400 of the web portal shown in FIG. 4B) to transition from using the first PSP 144(1) to using the second PSP 144(2), wherein the transferred data represents existing on-file grants 122 associated with the merchant 130 and the first PSP 144(1). In this manner, customers of the merchant 130 who had already provided approval for the merchant 130 to user their identifiers 120 to process payments via the first PSP 144(1) do not have to provide additional input indicating their approval for the merchant 130 to use their identifiers 120 to process payments via the target, second PSP 144(2).

It is to be appreciated that the web portal illustrated in FIGS. 4A and 4B is one example tool that may be accessible to merchants for submitting a request, such as the request received at block 206 of the process 200. Another example tool may be a web portal or the like that is accessible to personnel associated with the payment service 110. In this example, a merchant 130 may contact such personnel and describe the PSP 144 arrangement that they desire in order to process payments using identifiers 120 of users 102 in lieu of payment data, and the personnel may enter the requisite information into the web portal on behalf of the merchant 130 to set them up for concurrently using multiple PSPs 144 or transitioning from using one PSP 144 to another PSP 144 without interruption to their customer base in terms of processing payments using the identifiers 120. Another example tool that may be used to submit and/or process request from a merchant to associate a new PSP(s) 144 with the merchant is an API(s). An API(s) may facilitate an implementation whereby a merchant 130 can start using a new PSP 144 without necessarily notifying the payment service 110 other than beginning to process payments using the new PSP 144 for transactions with their customers. For example, a merchant 130 may start using the second PSP 144(2) to process payments in association with one or more of the merchant's retail channels, and the API(s) may programmatically, and automatically (e.g., without intervention of the merchant), send, to the server(s) 112, a request to associate the second PSP 144(2) with the merchant 130.

Figure 5:
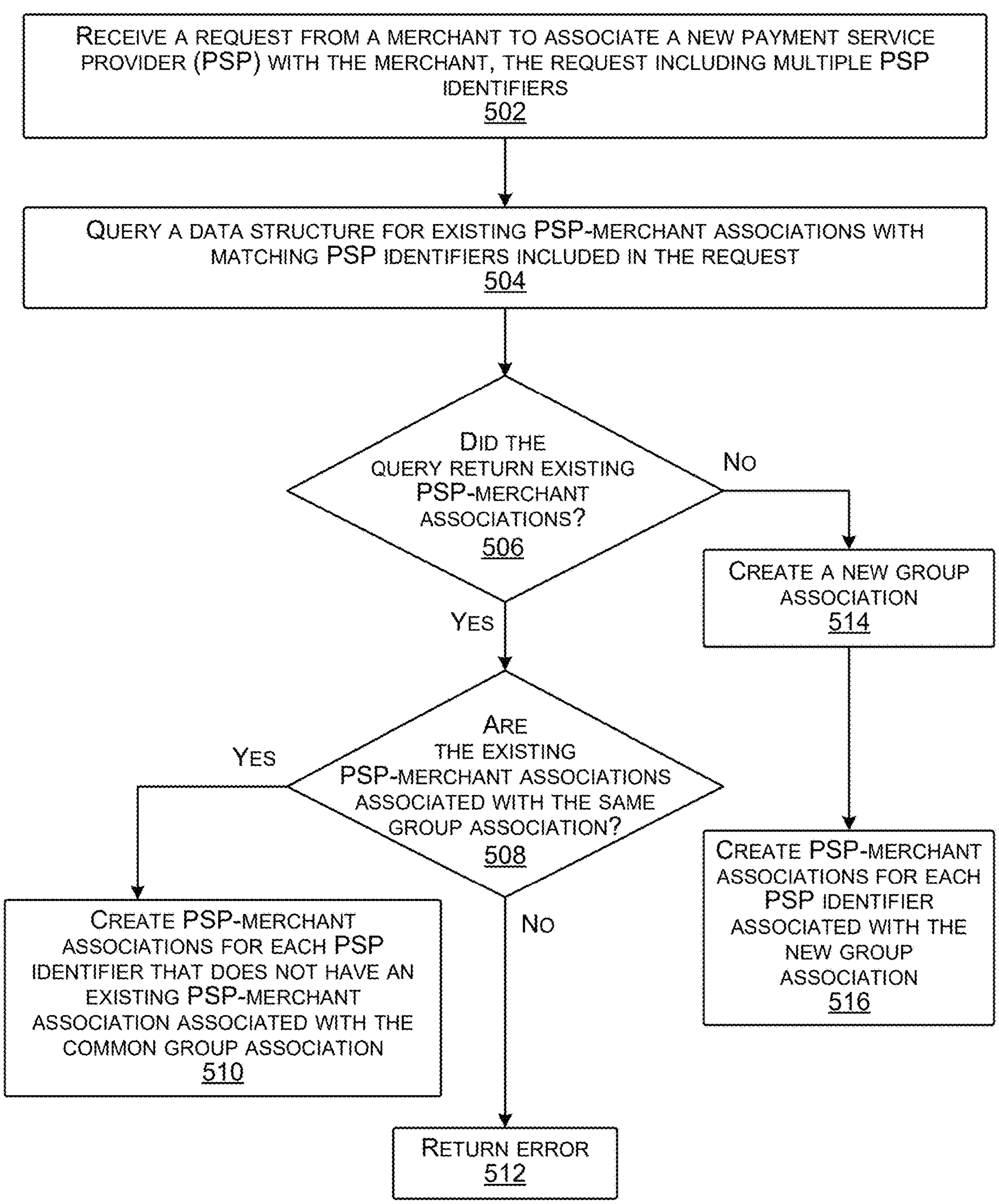
FIG. 5 is an example process for processing a request from a merchant to associate with one or more new PSPs so that the new PSP(s) can be used by the merchant for processing payments for future transactions with users using identifiers associated with user accounts of the users, according to an implementation of the present subject matter.

FIG. 5 is an example process 500 for processing a request from a merchant 130 to associate with one or more new PSPs 144 so that the new PSP(s) 144 can be used by the merchant 130 for processing payments for future transactions with users 102 using identifiers 120 associated with user accounts 118 of the users 102, according to an implementation of the present subject matter. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 500. The process 500 can be implemented by a system including one or more processors and memory storing computer-executable instructions to cause the one or more processors to perform the process 500. In some examples, the process 500 can be implemented by a processing device(s) (e.g., a computing system and/or a server(s) 112 of the payment service computing platform). For discussion purposes, the process 500 is described with reference to the previous figures.

At 502, a request to associate a new PSP(s) 144 with the merchant is received from a merchant device 146 of the merchant 130. In some examples, the payment service computing platform (e.g., the server(s) 112, the association component 138 executing thereon, etc.) may receive the request at block 502. In some examples, as indicated in block 502, the request received at block 502 includes multiple identifiers of PSPs 144 (sometimes referred to herein as "PSP identifiers"). In some examples, the request is received at block 502 via a web portal (e.g., via the user interface 400 of the web portal depicted in FIG. 4A or 4B), an API, and/or the like. In some examples, the request received at block 502 is a request to concurrently use multiple PSPs 144 (e.g., a first PSP 144(1) that the merchant 130 is currently using, a second PSP 144(2) that the merchant 130 would like to start using, etc.) for processing payments using identifiers 120 associated with user accounts 118 of users 102. For example, the request may be received at block 502 in response to an interaction with (e.g., a selection of) the interactive element 408 (e.g., the "Save" button) after selecting the option 402 in the user interface 400, and after entering, via the user interface 400, identifiers of the PSPs 144 that the merchant 130 would like to concurrently use, including their current PSP 144, such as the first PSP 144(1). In some examples, the request received at block 502 is a request to transition from using one PSP 144 to using the another PSP 144 for processing payments using identifiers 120 associated with user accounts 118 of users 102. For example, the request may be received at block 502 in response to an interaction with (e.g., a selection of) the interactive element 408 (e.g., the "Save" button) after selecting the option 410 in the user interface 400, and after entering, via the user interface 400, an identifier of the target PSP 144 that the merchant 130 would like to use. In this latter scenario, the association component 138 may be configured to retrieve an identifier of the PSP 144 the merchant is currently using, such as the first PSP 144(1), and to augment the request with the retrieved PSP identifier.

At 504, a data structure is queried for existing PSP-merchant associations 126 that include PSP identifiers matching the PSP identifiers in the request. In some examples, the payment service computing platform (e.g., the server(s) 112, the association component 138 executing thereon, etc.) may query the data structure at block 504. In some examples, the data structure is maintained in the data store(s) 116. In some examples, the data structure is a relational database, a graph database, a time series database, a multi-model database, an object-oriented database, and/or the like. An individual PSP-merchant association 126, as its name implies, may indicate an association between a merchant 130 and a PSP 144.

At 506, a determination is made as to whether the query returned existing PSP-merchant associations 126. In some examples, the payment service computing platform (e.g., the server(s) 112, the association component 138 executing thereon, etc.) may make the determination at block 506. If the query returned existing PSP-merchant associations 126 at block 506, the process 500 may follow the YES route from block 506 to block 508.

At 508, a determination is made as to whether the existing PSP-merchant associations 126 returned at block 506 are associated with the same group association 124. In some examples, the payment service computing platform (e.g., the server(s) 112, the association component 138 executing thereon, etc.) may make the determination at block 508. Recall that group associations 124 are stored in the data structure (e.g., in the data store 116), and that an individual group association 124 indicates an association between a merchant 130 and multiple PSPs 144 (e.g., a first PSP 144(1) and a second PSP 144(2), and possibly one or more additional PSPs 144). If the existing PSP-merchant associations 126 returned at block 506 are associated with the same group association 124, the process 500 may follow the YES route from block 508 to block 510.

At 510, a new PSP-merchant association 126 is created for each PSP identifier in the request that is not associated with an existing PSP-merchant association associated with the common group association 124. In some examples, the payment service computing platform (e.g., the server(s) 112, the association component 138 executing thereon, etc.) may create the new PSP-merchant association(s) 126 block 510. If, at 508, the existing PSP-merchant associations 126 are not associated with the same group association 124, the process 500 may follow the NO route from block 508 to block 512 where an error is returned (e.g., by the association component 138). Returning to block 506, if the query did not return existing PSP-merchant associations 126, the process 500 may follow the NO route from block 506 to block 514.

At 514, a new group association 124 is created to associate the merchant 130 and the multiple PSPs 144 indicated by the PSP identifiers included in the request received at block 502. In some examples, the payment service computing platform (e.g., the server(s) 112, the association component 138 executing thereon, etc.) may create the new group association 124 at block 514, such as by storing the new group association 124 in the data structure.

At 516, a new PSP-merchant association 126 is created for each PSP identifier in the request that is now associated with the new group association 124 created at block 514. In some examples, the payment service computing platform (e.g., the server(s) 112, the association component 138 executing thereon, etc.) may create the new PSP-merchant association(s) 126 at block 516, such as by storing the new PSP-merchant association(s) 126 in the data structure.

FIG. 6 is a diagram illustrating an example data structure 600 that stores data for facilitating payments for merchants that use multiple PSPs. In the example of FIG. 6, the data structure 600 may represent a relational database, although, as mentioned above, the data structure (e.g., the data structure 600) described herein may be any other suitable type of data structure, such as a graph database, a time series database, a multi-model database, an object-oriented database, and/or the like. In the example of FIG. 6, the data structure 600 includes multiple tables 602(1), 602(2), 602(3), and 602(4). The first table 602(1) may be populated with the user interface data 128 described herein. In some examples, the user interface data 128 in the first table 602(1) is used for causing presentation, via the payment application 108 executing on a user device 104 of a user 102, of one or more visual indications 302 described herein, such as the visual indications 302 shown in the user interface 300 of FIGS. 3A and 3C. As described above, an individual visual indication 302, when presented via the payment application 108 executing on a user device 104 of a user 102, indicates that a merchant (e.g., the merchant 130) is approved to use an identifier 120 associated with a user account 118 of the user 102 for transactions with the user 102. Accordingly, if the first table 602(1) is populated with user interface data 128 that is used to present such a visual indication 302, the visual indication 302 is presented via the payment application 108 when the user 102 requests to view the user interface 300 (e.g., a "Linked Accounts & Businesses" user interface). By contrast, if such user interface data 128 is deleted from the first table 602(1), the corresponding visual indication 302 is not presented via the payment application 108 when the user 102 requests to view the user interface 300 (e.g., a "Linked Accounts & Businesses" user interface).

The second table 602(2) may be populated with on-file grants 122 that have been established. Recall that an individual on-file grant 122 represents a stored association between a user 102, a merchant 130, and a PSP 144 that enables the merchant 130 to use the identifier 120 (e.g., alias, service provider-issued payment instrument identifier, etc.) associated with the user 102 to process, via the PSP 144, payments for future transactions. Accordingly, if a merchant 130 can transact with a user 102 using the identifier 120 associated with a user account 118 of the user 102 as a payment method to process, via a PSP 144, payment for the transaction so long as the second table 602(2) is populated with an on-file grant 122 that associates the user 102, the merchant 130, and the PSP 144 involved in the transaction.

The third table 602(3) may be populated with group associations 124, and the fourth table 602(4) may be populated with PSP-merchant associations 126, as described herein. In some examples, the third table 602(3) and the fourth table 602(4) are populated with the group associations 124 and the PSP-merchant associations 126, respectively, based on performing the process 500 of FIG. 5. In some examples, the third table 602(3) and the fourth table 602(4) are populated with the group associations 124 and the PSP-merchant associations 126, respectively, based on input provided by a merchant 130 via the user interface 400 of the web portal, which is described above with respect to FIGS. 4A and 4B. In some examples, an individual group association 124 can be associated with a plurality of PSP-merchant associations 126. In some examples, an individual PSP identifier (described above in the context of the process 500 of FIG. 5) is unique to an individual PSP-merchant association 126, which facilitates looking up a common group association 124 for each PSP identifier that is received in a request from a merchant 130 to associate a new PSP 144 with the merchant 130.

In some examples, the first table 602(1) includes a field for identifiers of group associations 124 maintained in the third table 602(3), as well as a unique compound index that is usable to query the first table 602(1) to determine if the first table 602(1) is populated with user interface data 128 associated with a particular group association 124. In some examples, the first table 602(1) includes a field to track deletions of user interface data 128.

In some examples, the second table 602(2) includes a field for identifiers of group associations 124 maintained in the third table 602(3), as well as a unique compound index that is usable to query the second table 602(2) to revoke on-file grants 122 associated with a particular group association 124 when a revocation request is received. An example of a revocation request and associated process 324 are described above with reference to FIGS. 3C and 3D.

Figure 7:
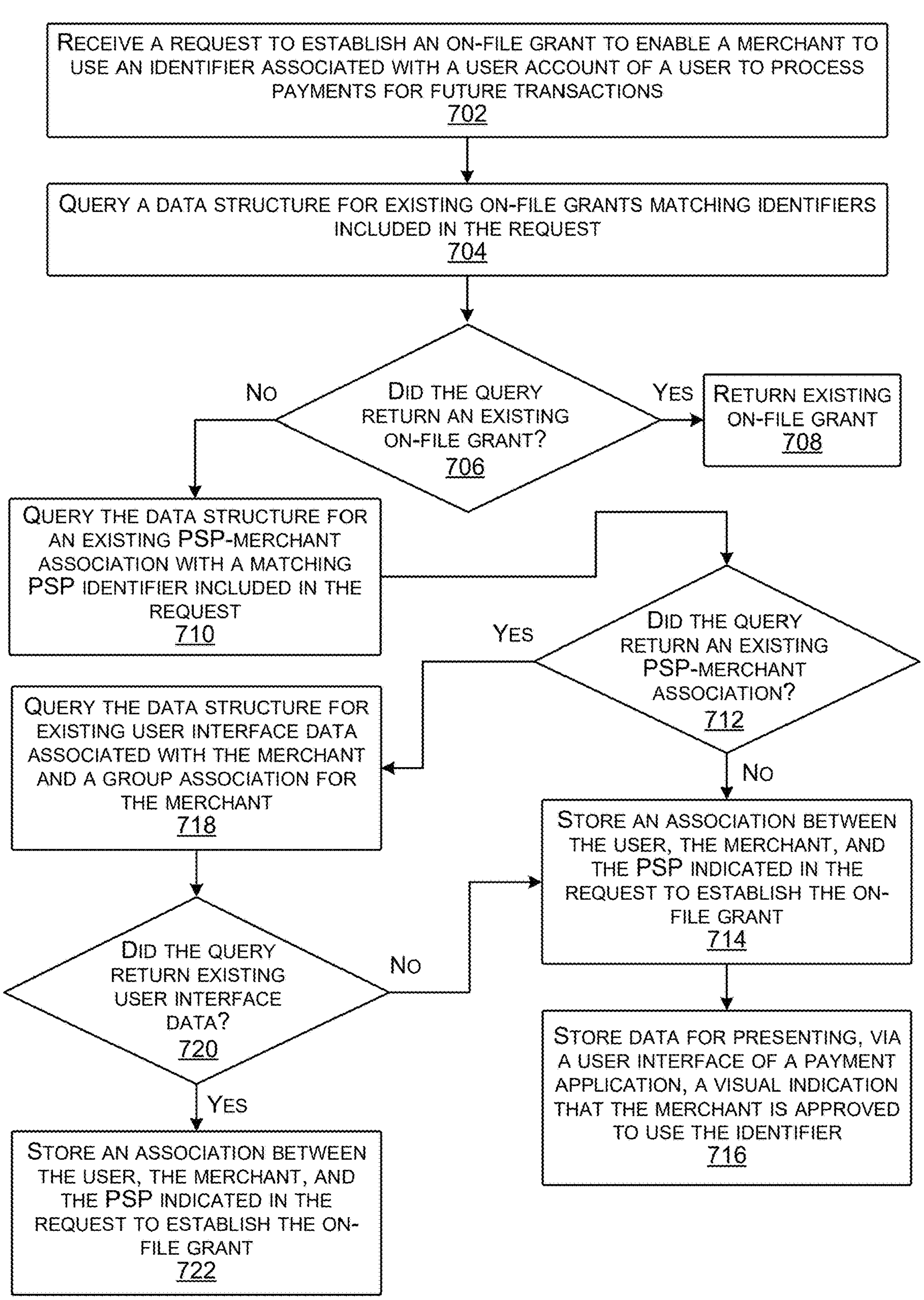
FIG. 7 is an example process for processing a request to establish an on-file grant to enable a merchant to use an identifier associated with a user account of a user to process payments for future transactions, according to an implementation of the present subject matter.

FIG. 7 is an example process 700 for processing a request to establish an on-file grant 122 to enable a merchant 130 to use an identifier 120 associated with a user account 118 of a user 102 to process payments for future transactions, according to an implementation of the present subject matter. The process 700 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 700. The process 700 can be implemented by a system including one or more processors and memory storing computer-executable instructions to cause the one or more processors to perform the process 700. In some examples, the process 700 can be implemented by a processing device(s) (e.g., a computing system and/or a server(s) 112 of the payment service computing platform). For discussion purposes, the process 700 is described with reference to the previous figures.

At 702, a request to establish an on-file grant 122 to enable a merchant 130 to use an identifier 120 associated with a user account 118 of a user 102 to process payments for future transactions is received. In some examples, the payment service computing platform (e.g., a server(s) 112, the association component 138 and/or the transaction component 142 executing thereon, etc.) may receive the request at block 702. In some examples, the request received at block 702 may be similar to the first request received at block 202 of the process 200, which is described above. For example, the request received at block 702 may indicate, among other things, the user 102, the merchant 130, and/or a PSP 144 used by the merchant 130 for processing payments. In some examples, the request received at block 702 may indicate the user 102, the merchant 130, and/or the PSP 144 in any suitable manner, such as by including, in the request, respective identifiers that identify the user 102, the merchant 130, and/or the PSP 144.

At 704, a data structure is queried for existing on-file grants 122 that include identifiers matching the identifiers in the request. In some examples, the payment service computing platform (e.g., the server(s) 112, the association component 138 executing thereon, etc.) may query the data structure at block 704. In some examples, the data structure is maintained in the data store(s) 116. In some examples, the data structure is a relational database (e.g., the data structure 600), a graph database, a time series database, a multi-model database, an object-oriented database, and/or the like.

At 706, a determination is made as to whether the query returned any existing on-file grants 122. In some examples, the payment service computing platform (e.g., the server(s) 112, the association component 138 executing thereon, etc.) may make the determination at block 706. If the query returned an existing on-file grant 122 at block 706, the process 700 may follow the YES route from block 706 to block 708 where the existing on-file grant 122 is returned. In some examples, if the request received at block 702 is associated with a transaction (e.g., a transaction 132 between the user 102 and the merchant 130), the transaction component 142 may send a response to the request based on the existing on-file grant 122 returned at block 708, the response indicating approval to use an identifier 120 associated with a user account 118 of the user 102 for payment of the transaction. If the query did not return an existing on-file grant 122 at block 706, the process 700 may follow the NO route from block 706 to block 710.

At 710, the data structure (e.g., the data structure 600) is queried for existing PSP-merchant associations 126 that include a PSP identifier matching the PSP identifier in the request. In some examples, the payment service computing platform (e.g., the server(s) 112, the association component 138 executing thereon, etc.) may query the data structure at block 710. As mentioned above, an individual PSP-merchant association 126 may indicate an association between a merchant 130 and a PSP 144.

At 712, a determination is made as to whether the query returned any existing PSP-merchant associations 126. In some examples, the payment service computing platform (e.g., the server(s) 112, the association component 138 executing thereon, etc.) may make the determination at block 712. If the query did not return an existing PSP-merchant association 126 at block 712, the process 700 may follow the NO route from block 712 to block 714.

At 714, an association between the user 102, the merchant 130, and the PSP 144 is stored in the data structure (e.g., the data structure 600) to establish the on-file grant 122. In some examples, the payment service computing platform (e.g., the server(s) 112, the association component 138 executing thereon, etc.) may store the association at block 714. In some examples, storing the association at block 714 includes creating the association in the data structure in the sense that the association may not exist in the data structure prior to block 714.

At 716, data (e.g., user interface data 128) for causing presentation, via the payment application 108 executing on a user device 104 of the user 102, of the visual indication 302 that the merchant 130 is approved to use the identifier 120 associated with the user account 118 of the user 102 for transactions with the user 102 is stored in the data structure (e.g., the data structure 600). In some examples, the payment service computing platform (e.g., the server(s) 112, the user interface component 140 executing thereon, etc.) may store the data (e.g., the user interface data 128) at block 716. Returning to block 712, if the query returned an existing PSP-merchant association 126, the process 700 may follow the YES route from block 712 to block 718.

At 718, the data structure (e.g., the data structure 600) is queried for existing data (e.g., user interface data 128) associated with the merchant 130 indicated in the request and a group association 124 for the merchant 130. In some examples, the payment service computing platform (e.g., the server(s) 112, the association component 138 executing thereon, etc.) may query the data structure at block 718.

At 720, a determination is made as to whether the query returned any existing data (e.g., user interface data 128). In some examples, the payment service computing platform (e.g., the server(s) 112, the association component 138 executing thereon, etc.) may make the determination at block 720. If the query did not return existing data (e.g., user interface data 128) at block 720, the process 700 may follow the NO route from block 720 to block 714, and operations described above with reference to blocks 714 and 716 may be performed. If the query returned existing data (e.g., user interface data 128) at block 720, the process 700 may follow the YES route from block 720 to block 722.

At 722, an association between the user 102, the merchant 130, and the PSP 144 is stored in the data structure (e.g., the data structure 600) to establish the on-file grant 122. In some examples, the payment service computing platform (e.g., the server(s) 112, the association component 138 executing thereon, etc.) may store the association at block 722. In some examples, storing the association at block 722 includes creating the association in the data structure in the sense that the association may not exist in the data structure prior to block 722. Notably, in following the YES route from block 720, the on-file grant 122 is established without storing data (e.g., user interface data 128) for causing presentation, via the payment application 108 executing on a user device 104 of the user 102, of the visual indication 302 that the merchant 130 is approved to use the identifier 120 associated with the user account 118 of the user 102 for transactions with the user 102. The omission of storing such data (e.g., user interface data 128) after following the YES route from block 720 avoids storing duplicative data that would cause the user interface 300 of the payment application 108 to list the same merchant 130 in multiple line items. This, in turn, leads to an improved user experience if and when the user 102 decides to revoke approval of the merchant 130 to use their identifier 120 because the user 102 does not have to provide input, via the payment application 108, with respect to multiple duplicate line items to revoke approval for a single merchant 130.

The examples described above relate, in part, to facilitating payments for merchants that use multiple PSPs 144, wherein identifiers 120 (e.g., aliases, service provider-issued payment instrument identifiers, etc.) are used in lieu of payment data for such payments. The examples described below with reference to FIGS. 8 and 9 relate to facilitating payments for merchants that use multiple PSPs 144, wherein payment data (e.g., card-on-file data) is used for such payments. More specifically, the examples described below with reference to FIGS. 8 and 9 relate to techniques, devices, and systems for automating the transfer (e.g., import and/or export) of user payment data 148 (e.g., card-on-file data, such as data associated with credit cards, debit cards, etc.) between PSPs 144. For example, in conventional systems, when a merchant decides to transition from using a first PSP to using a second PSP for processing payments using user payment data (e.g., card-on-file data), a manual process is typically carried out to ensure that the user payment data (e.g., card-on-file data) is transferred securely, and also to minimize interruption in a user experience of purchasing items (e.g., goods and/or services) from the merchant using such payment data. A typical manual process can is time consuming and may involve a large number of engineers to ensure that the process runs smoothly.

The techniques, devices, and systems described herein provide an automated mechanism to securely transfer (e.g., import and/or export) user payment data 148 between PSPs 144. This improves the merchant experience by providing a streamlined flow to accomplish the transfer of user payment data 148 between PSPs 144 on behalf of the merchant 130. In some examples, a user interface (e.g., a dashboard) can be accessed by a merchant 130 to opt-in for exporting user payment data 148 associated with the merchant's customers. In some examples, the dashboard is a user-friendly interface that is used by the merchant 130 to indicate their preference for exporting user payment data 148 associated with the merchant's customers. Upon initiation of an export process by a merchant 130, an import-export component 150 may perform one or more identity verification operations to verify the identity of the merchant 130 using, at least in part, information provided by the merchant 130. The identity verification operation(s) ensures the legitimacy of the export request. The import-export component 150 may also perform one or more automated retrieval and encryption operations in response to verifying the identity of the merchant 130 associated with the export request. In some examples, the automated retrieval and encryption operations include retrieving user payment data 148 and encrypting the retrieved user payment data 148 using a saved public key associated with the target PSP 144. The import-export component 150 may also perform one or more secure transfer operations including uploading the encrypted user payment data 148 to a file server, and securely transmitting the encrypted user payment data 148 from the file server to a computing system of the target PSP 144 via a secure data transfer service. The techniques, devices, and systems described below with reference to FIGS. 8 and 9 provide merchants with a streamlined and secure mechanism for exporting user payment data 148 of the merchant's customers, thereby enhancing both convenience and data protection.

Figure 8:
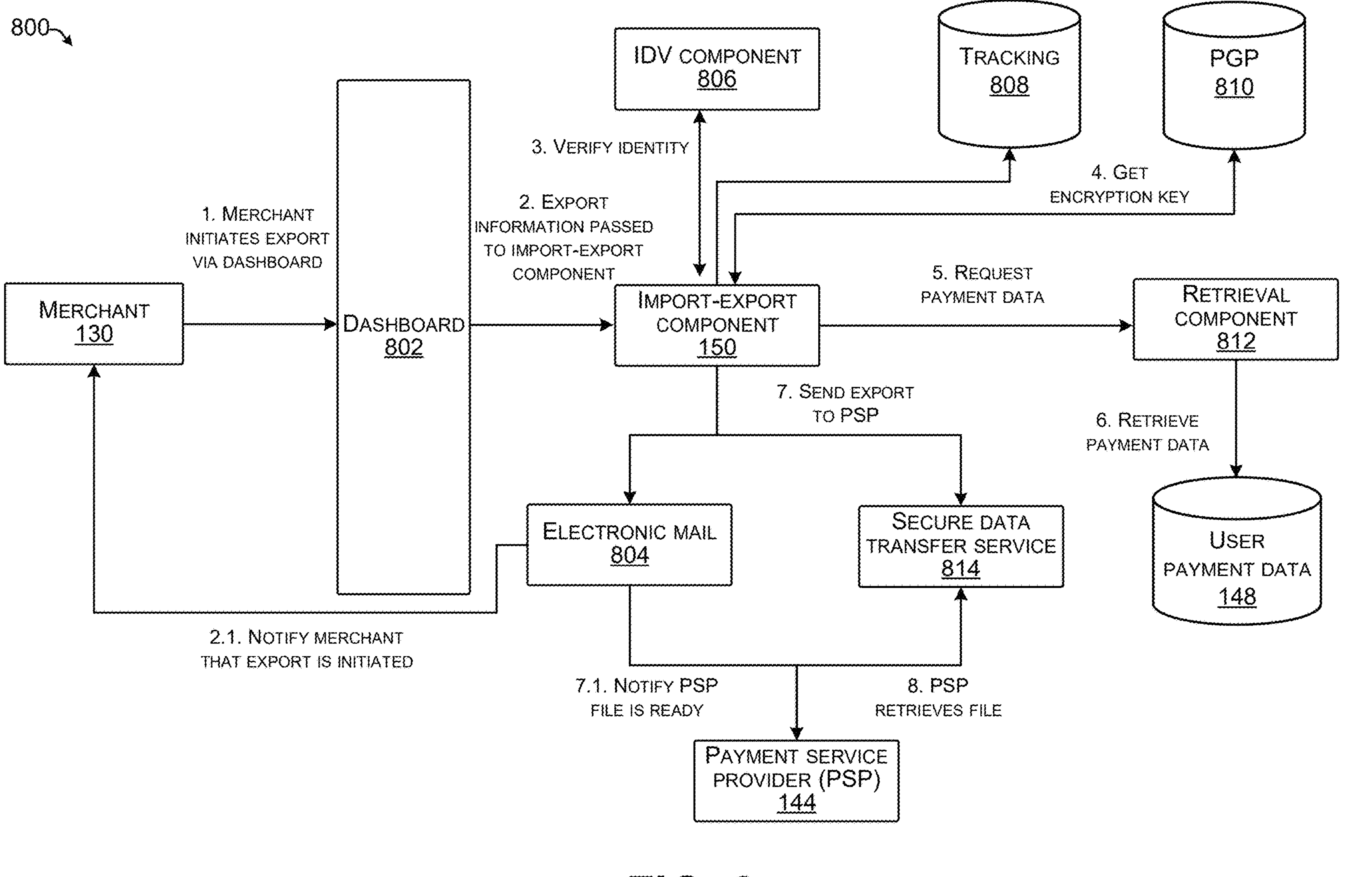
FIG. 8 is a diagram illustrating an example technique for transferring user payment data to a target PSP, according to an implementation of the present subject matter.

FIG. 8 is a diagram 800 illustrating an example technique for transferring user payment data 148 to a target PSP 144, according to an implementation of the present subject matter. To illustrate, if a merchant 130 would like to transition from using a first PSP 144(1) to using a second PSP 144(2) for processing payments using user payment data 148 (e.g., card-on-file data), the merchant 130 may access a dashboard 802 and may initiate an export of user payment data 148 via the dashboard 802, as shown in Step 1 of FIG. 8. Turning briefly to FIG. 9, an example user interface 900 of such a dashboard 802 is shown.

The user interface 900 may be displayed on a merchant device 146 of the merchant 130. In some examples, the user interface 900 may be displayed in response to the merchant 130 accessing, via a web browser, a landing page and subsequently interacting with (e.g., selecting) an interactive element (e.g., a "Start Export" button) on the landing page. The user interface 900 may represent an export request page from which the merchant 130 can initiate an export request for migrating user payment data 148 to a PSP 144 with a Payments Card Industry (PCI) Attestation of Compliance (AOC).

In the example of FIG. 9, the user interface 900 includes a form that can be filled out by the merchant 130 to request an export of user payment data 148 to a PSP 144. In general, the form may solicit information that will be used to perform account verification, export, and/or file transfer operations in association with the export request. In the example of FIG. 9, the user interface 900 includes multiple text entry fields for the merchant 130 to fill out. For example, the user interface 900 may include a first field 902 for the merchant 130 to specify the PSP 144 to which the user payment data 148 is to be exported. In some examples, the first field 902 includes a dynamic drop down element 904 that, upon selection, reveals a list of PSPs 144 that are trusted. In some examples, the merchant 130 may begin typing the name of the target PSP 144 within the first field 902, and the first field 902 may automatically populate with a suggested PSP 144 that includes the typed characters (e.g., letters). The user interface 900 may further include a second field 906 for the merchant 130 to specify an electronic mail (email) address of the merchant to use during the export process. In some examples, if the merchant 130 is logged in to an account (e.g., a merchant account), the second field 906 is automatically populated with the email address of the merchant 130 that is on file in association with the merchant account. The user interface 900 may further include a third field 908 for the merchant 130 to input a date of birth, and/or a fourth field 910 for the merchant 130 to input the last four digits of a social security number (SSN), which are to be used for identity verification purposes. In some examples, the user interface 900 may further include an interactive element 912 (e.g., a "Submit" button) that, when interacted with (e.g., selected) submits the export request with the information entered by the merchant 130.

Returning with reference to FIG. 8, in response to an interaction with (e.g., a selection of) the interactive element 912 of the dashboard 802 user interface 900, the information entered by the merchant 130 via the user interface 900 is passed to an import-export component 150 for further processing, as shown in Step 2 of FIG. 8. As shown in Step 2.1, the import-export component 150 may notify the merchant (e.g., via email 804) that the export is initiated. The import-export component 150 may then perform one or more identity verification operations to verify the identity of the merchant 130 based at least in part on the information entered by the merchant 130 via the user interface 900, as shown in Step 3 of FIG. 8. As mentioned above, the identity verification operation(s) ensures the legitimacy of the export request, reducing the risk of sensitive user information (including financial information) from being inappropriately exported. In the example of FIG. 8, an identity verification (IDV) component 806 compares the merchant-provided date of birth with a stored date of birth associated with the merchant 130, and compares the merchant-provided last four digits of the SSN to the last four digits of a stored SSN associated with the merchant 130 to determine if they both match. If there is a mismatch with either the date of birth or the last four digits of the SSN, or both, an error may be returned, and the merchant 130 may be notified that their export request cannot be processed. If both the date of birth and the last four digits of the SSN match, the identity verification is successful, and the import-export component 150 continues the export process. Date of birth and SSN are two examples of information that may be used in IDV; examples are also considered in which other verification techniques are implemented, such as the use of a verifiable credential presented with a request to access the data to be exported by a decentralized identifier, among others. In some examples, the user interface 900 is refreshed in response to a successful identity verification, such as by freezing the information entered by the merchant 130 into the fields of the user interface 900, and by presenting text to the merchant 130 via the user interface 900 indicating that the export request was successfully submitted.

In some examples, export request data is logged in a tracking data store 808. The logged export request data may be used to improve the export process in the future and/or for auditing and/or risk mitigation purposes. Example export request data that can be logged in the tracking data store 808 includes a timestamp of an export request, an identifier of the export request, a token associated with the requesting merchant 130, a number of payment instruments (e.g., credit cards, debit cards, etc.) to be exported, a target PSP 144, the status of the export request, the result of the identity verification process, a validity of the export request (e.g., is the target PSP 144 known with a valid PCI AOC or unknown), and/or the like.

As shown in Step 4 of FIG. 8, the import-export component 150 may retrieve an encryption key associated with the target PSP 144 following a successful identity verification. In the example of FIG. 8, the encryption key may represent a Pretty Good Privacy (PGP) key retrieved from a PGP data store 810. However, it is to be appreciated that a PGP key is just one example of an encryption key that can be retrieved in Step 4. As shown in Step 5 of FIG. 8, the import-export component 150 may request payment data from a retrieval component 812, and the retrieval component 812 may retrieve user payment data 148, as shown in Step 6 of FIG. 8. Since the user payment data 148 is sensitive and private data, there may be tight controls around the permissions given to the retrieval component 812 to retrieve such user payment data 148. In some examples, the retrieval performed in Step 5 includes identifying relevant user payment data 148 associated with the requesting merchant 130 and exporting the user payment data 148 into a file, such as a comma separated values (CSV) file. Once the file containing the exported user payment data 148 is created, the file may be stored in temporary storage and returned to the import-export component 150 so that the import-export component 150 can encrypt the file using the encryption key retrieved in Step 4.

As shown in Step 7 of FIG. 8, the encrypted export file (e.g., CSV file) containing the user payment data 148 may be transferred to the target PSP 144 using a secure data transfer service 814. As shown in Step 7.1 of FIG. 8, the import-export component 150 may notify the PSP 144 (e.g., via email 804) that the encrypted export file is ready, and, in Step 8 of FIG. 8, the PSP 144 may retrieve the encrypted export file using the secure data transfer service 814. The secure data transfer service 814 may be an end-to-end encryption platform designed to transfer files. In some examples, prior to transferring the encrypted export file to the PSP 144, the import-export component 150 determines whether there is a valid PCI AOC on file for the target PSP 144. If a valid PCI AOC is identified for the target PSP 144, the export process proceeds by transferring the encrypted export file. However, if a valid PCI AOC is not identified for the target PSP 144 (e.g., if the PSP 144 is a new PSP, and/or if the PCI AOC of the PSP 144 has expired) then the import-export component 150 may request a PCI AOC from the PSP 144, and the returned PCI AOC is reviewed before proceeding with the export process. Although the example described above with respect to FIGS. 8 and 9 relates to an export request, which may involve exporting user payment data 148 maintained in the data store(s) 116, which may include one or more internal data stores that are "in-house" with respect to the payment service computing platform described herein, it is to be appreciated that the import-export component 150, as its name implies, may be configured to handle import requests, which may involve importing user payment data 148 maintained in an external data store(s) of an external PSP 144, and transferring an encrypted export file (e.g., CSV file) containing the user payment data 148 "in house" with respect to the payment service computing platform. This import request may be made when, for instance, the target PSP 144 is associated with an entity that operates the payment service computing platform (e.g., the server(s) 112). That is, if the target PSP 144 in the example of FIG. 8 is an "in-house" PSP 144 that is associated with the same entity that owns and/or operates the payment service computing platform (e.g., the server(s) 112), the transfer of the user payment data 148 may be handled as an import request.

The user interfaces 300, 400, and 900 are provided as examples of user interfaces that can be presented to facilitate techniques described herein. User interfaces can present additional or alternative data in additional or alternative configurations. That is, user interfaces 300, 400, and 900 should not be construed as limiting.

Figure 10:
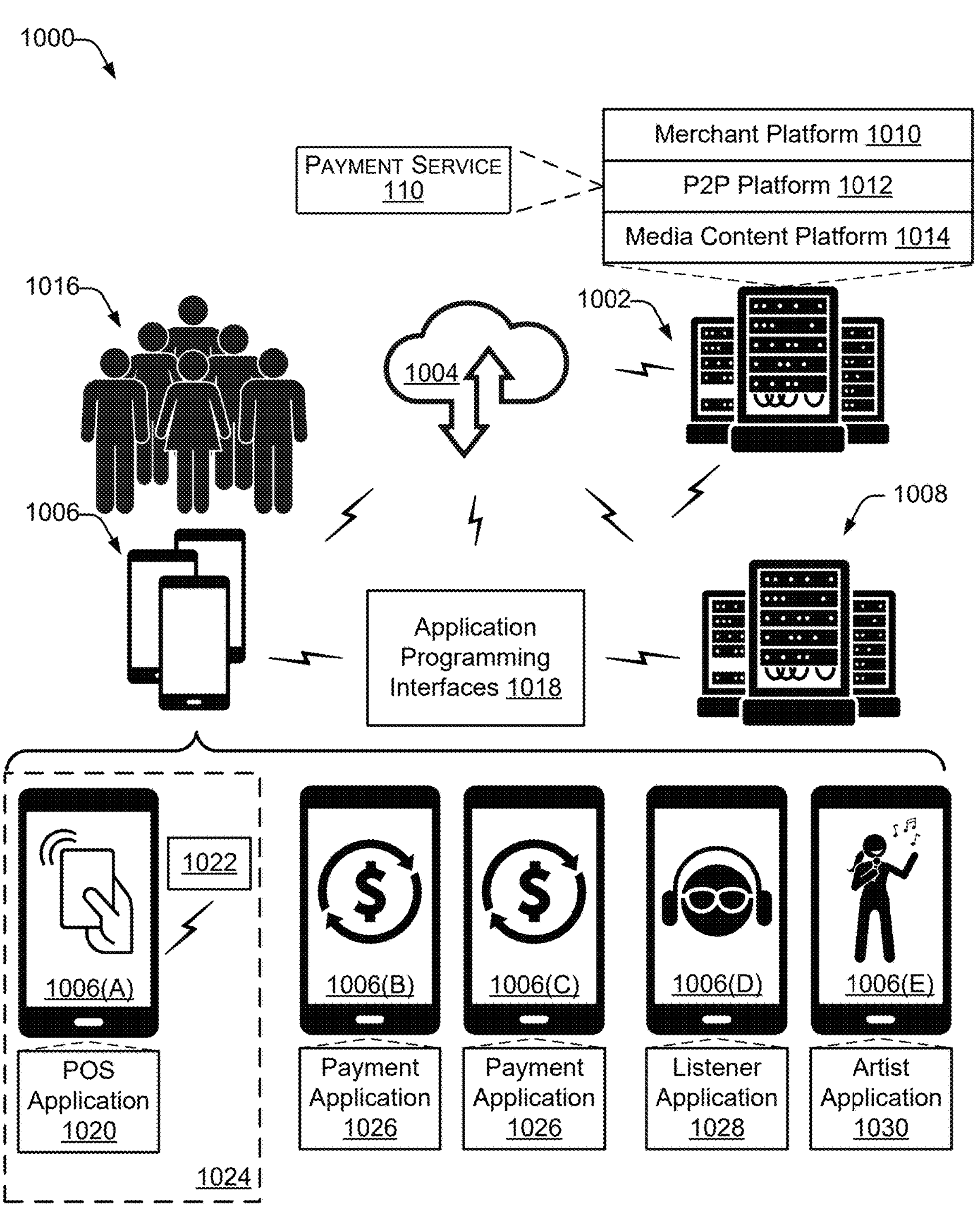
FIG. 10 is an example environment for performing techniques described herein.

FIG. 10 illustrates an example environment 1000. The environment 1000 includes server(s) 1002 that can communicate over a network 1004 with end user devices 1006 and/or server(s) 1008 associated with third-party service provider(s). In various examples, the end user devices 1006 may comprise one or more seller devices 1006(A), one or more user devices 1006(B) and/or 1006(C) in a peer network, one or more content consumption devices 1006(D), one or more artist user devices 1006(E), combinations of these examples, or other categories of user devices. The server(s) 1002 can be associated with one or more service providers that can provide one or more services for the benefit of users 1016, as described below. For example, the server(s) 1002 may enable services of service providers such as in association with a merchant platform 1010 (which may further include a buyer platform), a peer-to-peer (P2P) payment platform 1012, a media content platform 1014, a combination of these platforms, or other platforms associated with other service providers. While services and features are referenced throughout in connection with a particular one of the merchant platform 1010, the P2P payment platform 1012, or the media content platform 1014, it should be understood that any of these platforms may perform the functionality described in relation to any of the other platforms. Actions attributed to the service provider(s) can be performed by the server(s) 1002.

In some examples, the server(s) 1002 may be the same as or similar to the server(s) 112 introduced in FIG. 1, and the server(s) 1002 may implement the payment service 110. Accordingly, the server(s) 1002 may include the association component 138, the user interface component 140, the transaction component 142, and/or the import-export component 150, as described herein. Furthermore, the server(s) 1008 may represent one or more servers of a PSP(s) 144, as described herein, and/or the server(s) 1008 may be the same as or similar to the merchant system 136 introduced in FIG. 1. In some examples, the end user device(s) 1006 may be the same as or similar to the user devices 104 introduced in FIG. 1, the users 1016 may be the same as or similar to the users 102 introduced in FIG. 1, and the network(s) 1004 may be the same as or similar to the network(s) 114 introduced in FIG. 1. In addition, the application(s) 1026 may be the same as or similar to the payment application 108 introduced in FIG. 1.

In accordance with the examples described herein, the server(s) 1002 may facilitate payments for merchants that use multiple PSPs. The server(s) 1002 may receive a first request to establish a first on-file grant to enable a merchant to use an identifier associated with a user account of a user 1016 to process payments for future transactions, wherein the first request indicates a first PSP used by the merchant for processing payments, and the server(s) 1002 may store, in a data structure, a first association between the user 1016, the merchant, and the first PSP to establish the first on-file grant. The server(s) 1002 may receive, from a merchant device of the merchant, a request to associate a second PSP with the merchant, and store, in the data structure, a group association between the merchant, the first PSP, and the second PSP. The server(s) 1002 may receive a second request to use the identifier for a transaction with the merchant, wherein the second request indicates that the transaction will be processed using the second PSP, and the server(s) 1002 may determine, based at least in part on the group association, that the identifier can be used for the transaction with the merchant, store, in the data structure, a second association between the user 1016, the merchant, and the second PSP to establish a second on-file grant, and send a response to the second request indicating approval to use the identifier for payment of the transaction.

In some examples, individual ones of the end user devices 1006 can be operable by users 1016. The users 1016 (individually referred to herein as "user 1016") can be referred to as customers, buyers, merchants, sellers, borrowers, employees, employers, payors, payees, couriers, artists, musicians, listeners, fans, supervisors, hosts, audience members, and so on. The users 1016 can interact with the end user devices 1006 via user interfaces presented via the end user devices 1006. In at least one example, a user interface can be presented via a web browser, or the like. Alternatively or additionally, a user interface can be presented via an application, such as a mobile application or desktop application, which can be provided by the merchant platform 1010, the P2P payment platform 1012, and/or the media content platform 1014, or which can be an otherwise dedicated application. In some examples, individual end user devices 1006 can have an instance or versioned instance of an application, which can be downloaded from an application store, for example, which can present the user interface(s) described herein.

In at least one example, the users 1016 can include merchants that can operate the seller device(s) 1006(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1006(A) can have an instance of a point of sale ("POS") application 1020 stored thereon. The POS application 1020 can configure the seller device 1006(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1020 can determine transaction data associated with the POS transactions. Transaction data can include payment information, which can be obtained from a reader device 1022 associated with the seller device 1006(A), user authentication data, purchase amount information, point-of-purchase information (e.g., item(s) purchased, date of purchase, time of purchase, subscription type, etc.), etc. The POS application 1020 can send transaction data to the server(s) 1002 such that the server(s) 1002 can track transactions of the customers, merchants, and/or the users 1016 over time. Furthermore, the POS application 1020 can present a UI to enable the merchant to interact with the POS application 1020 and/or the merchant platform 1010 via the POS application 1020.

In at least one example, the seller device 1006(A) can be a special-purpose computing device configured as a POS terminal (via the execution of the POS application 1020). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the seller device 1006(A), such as a microphone port, a headphone port, an audio-jack, a data port, or other suitable port. In additional or alternative examples, the reader device 1022 can be coupled to the seller device 1006(A) via another wired or wireless connection, such as via Bluetooth®, BLE, and so on. In some examples, the reader device 1022 can be a software solution executing on the POS terminal, e.g., a mobile phone. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1022, and communicate with the merchant platform 1010, which can provide, among other services, a payment processing service. The server(s) 1002 associated with the merchant platform 1010 can communicate with server(s) 1008, as described below. In this manner, the POS terminal and reader device 1022 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to customers of a merchant. In additional or alternative examples, the POS terminal can have a display integrated therein for presenting information to the customers of the merchant. POS systems, such as the POS system 1024, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1022, whereby the reader device 1022 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1024, the server(s) 1002, and/or the server(s) 1008 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1008.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1008 associated therewith) can forward the fund transfer request to an issuing bank (e.g., "issuer"). The issuer is a bank or financial institution that offers a financial account (e.g., credit or debit card account) to a user. The issuer (e.g., the server(s) 1008 associated therewith) can make a determination as to whether the customer has the capacity to absorb the relevant charge associated with the payment transaction. In at least one example, the merchant platform 1010 can serve as an issuer and/or can partner with an issuer. The transaction is either approved or rejected by the issuer and/or the card payment network (e.g., the server(s) 1008 associated therewith), and a payment authorization message is communicated from the issuer to the POS device via a path opposite of that described above, or via an alternate path.

The server(s) 1008 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1008 to authorize or decline transactions (e.g., the API 1018). In examples, the merchant platform 1010 can enable the merchants to receive cash payments, payment card payments, and/or electronic payments from customers for POS transactions and the service provider can process transactions on behalf of the merchants.

Based on the authentication notification that is received by the POS system 1024 from server(s) 1002, the merchant may indicate to the customer whether the transaction has been approved. In some examples, approval may be indicated at the POS system 1024, for example, at a display of the POS system 1024. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 1010 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the users 1016 can access all of the services. In some cases, the users 1016 can have gradated access to the services, which can be based on risk tolerance, IDV outputs, subscriptions, and so on. In at least one example, access to such services can be availed to the merchants via the POS application 1020. In additional or alternative examples, each service can be associated with its own access point (e.g., application, web browser, etc.).

As the merchant platform 1010 processes transactions on behalf of the merchants, the merchant platform 1010 can maintain accounts or balances for the merchants in one or more ledgers. For example, the merchant platform 1010 can analyze transaction data received for a transaction to determine an amount of funds owed to a merchant for the transaction and deposit funds into an account of the merchant. The account can have a stored balance, which can be managed by the merchant platform 1010. The account can be different from a conventional bank account at least because the stored balance is managed by a ledger of the merchant platform 1010 and the associated funds are accessible via various withdrawal channels including, but not limited to, scheduled deposit, same-day deposit, instant deposit, and a linked payment instrument.

A scheduled deposit can occur when the merchant platform 1010 transfers funds associated with a stored balance of the merchant to a bank account of the merchant that is held at a bank or other financial institution (e.g., associated with the server(s) 1008). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 1010 to the bank account of the merchant.

In at least one example, the merchant platform 1010 may provide inventory management services. That is, the merchant platform 1010 may provide inventory tracking and reporting. Inventory management services may enable the merchant to access and manage a database storing data associated with a quantity of each item that the merchant has available (i.e., an inventory). Furthermore, in at least one example, the merchant platform 1010 can provide catalog management services to enable the merchant to maintain a catalog, which can be a database storing data associated with items that the merchant has available for acquisition (i.e., catalog management services). The merchant platform 1010 can offer recommendations related to pricing of the items, placement of items on the catalog, and multi-party fulfillment of the inventory, to name a few examples.

In at least one example, the merchant platform 1010 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 1010 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 1010 can provide financing services for offering and/or lending a loan to a borrower that is to be used for, in some instances, financing the borrower's short-term operational needs (e.g., a capital loan). Additionally or alternatively, the merchant platform 1010 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 1010 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 1010 can provide web-development services, which enable users 1016 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 1010 can recommend and/or generate content items to supplement omni-channel presences of the merchants.

Furthermore, the merchant platform 1010 can provide payroll services to enable employers to pay employees for work performed on behalf of employers. In at least one example, the merchant platform 1010 can receive data that includes time worked by an employee (e.g., through imported timecards and/or POS interactions), sales made by the employee, gratuities received by the employee, and so forth. Based on such data, the merchant platform 1010 can make payroll payments to employee(s) on behalf of an employer via the payroll service. For instance, the merchant platform 1010 can facilitate the transfer of a total amount to be paid out for the payroll of an employee from the bank of the employer to the bank of the merchant platform 1010 to be used to make payroll payments. In at least one example, when the funds have been received at the bank of the merchant platform 1010, the merchant platform 1010 can pay the employee, such as by check or direct deposit.

Moreover, in at least one example, the merchant platform 1010 can provide employee management services for managing schedules of employees. Further, the merchant platform 1010 can provide appointment services for enabling users 1016 to set schedules for scheduling appointments and/or users 1016 to schedule appointments.

In some examples, the merchant platform 1010 can provide restaurant management services to enable users 1016 to make and/or manage reservations, to monitor front-of-house and/or back-of-house operations, and so on. In such examples, the seller device(s) 1006(A) and/or server(s) 1002 can be configured to communicate with one or more other computing devices, which can be located in the front-of-house (e.g., POS device(s)) and/or back-of-house (e.g., kitchen display system(s) (KDS)). In at least one example, the merchant platform 1010 can provide order management services and/or fulfillment services to enable restaurants (or other merchant types) to manage open tickets, split tickets, and so on and/or manage fulfillment services.

In some examples, the merchant platform 1010 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 1010 can leverage other merchants and/or sales channels that are part of the merchant platform 1010 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 1010 can enable conversational commerce via conversational commerce services, which can use one or more machine learning mechanisms to analyze messages exchanged between two or more users 1016, voice inputs into a virtual assistant or the like, to determine intents of user(s) 1016. In some examples, the merchant platform 1010 can utilize determined intents to automate customer service, offer promotions, provide recommendations, or otherwise interact with customers in real-time. In at least one example, the merchant platform 1010 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1016 may be new to the merchant platform 1010 such that the user 1016 that has not registered (e.g., subscribed to receive access to one or more services offered by the merchant platform 1010) with the merchant platform 1010. The merchant platform 1010 can offer onboarding services for registering a potential user 1016 with the merchant platform 1010. In some examples, onboarding can involve presenting various questions, prompts, and the like to a potential user 1016 to obtain information that can be used to generate a profile for the potential user 1016. In at least one example, the merchant platform 1010 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 1010 can be transitioned to more permissive (e.g., less limited) or longer-term access to such services.

The merchant platform 1010 can be associated with IDV services, which can be used by the merchant platform 1010 for compliance purposes and/or can be offered as a service, for instance to third-party service providers (e.g., associated with the server(s) 1008). That is, the merchant platform 1010 can offer IDV services to verify the identity of users 1016 seeking to use or using their services. Identity verification may involve requesting a customer (or potential customer) to provide information that is used by compliance departments to prove that the information is associated with an identity of a real person or entity (e.g., an artist). In at least one example, the merchant platform 1010 can perform services for determining whether identifying information provided by a user 1016 accurately identifies the customer (or potential customer).

Techniques described herein can be configured to operate in both real-time/online and offline modes. "Online" modes refer to modes when devices are capable of communicating with the merchant platform 1010 while offline mode refers to modes when devices are unable to communicate with the server(s) 1008 due to network connectivity issue, for example. In such examples, devices may operate in "offline" mode where at least some payment data is stored (e.g., on the seller device(s) 1006(A)) and/or the server(s) 1002 until connectivity is restored and the payment data can be transmitted to the server(s) 1002 and/or the server(s) 1008 for processing.

In at least one example, the merchant platform 1010 can be associated with a hub, such as an order hub, an inventory hub, a fulfillment hub and so on, which can enable integration with one or more additional service providers (e.g., associated with the additional server(s) 1008). In some examples, such additional service providers can offer additional or alternative services and the service provider can provide an interface or other computer-readable instructions to integrate functionality of the service provider into the one or more additional service providers.

Turning now to the P2P functionality provided by the environment 1000, the P2P platform 1012 can provide a peer-to-peer payment service that enables peer-to-peer payments between two or more of the users 1016. Two or more of the users 1016 may be considered "peers" in a peer-to-peer interaction, such as a payment. In at least one example, the P2P platform 1012 can communicate with instances of a payment application 1026 (or other access point) installed on end user devices 1006 configured for operation by the users 1016. In an example, an instance of the payment application 1026 executing on a first user device 1006(B) operated by a payor (e.g., one of the users 1016) can send a request to the P2P platform 1012 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1016) via a peer-to-peer payment. In some examples, assets associated with an account of the payor are transferred to an account of the payee. In some examples, assets can be held at least temporarily in an account of the P2P platform 1012 prior to transferring the assets to the account of the payee.

Figure 11:
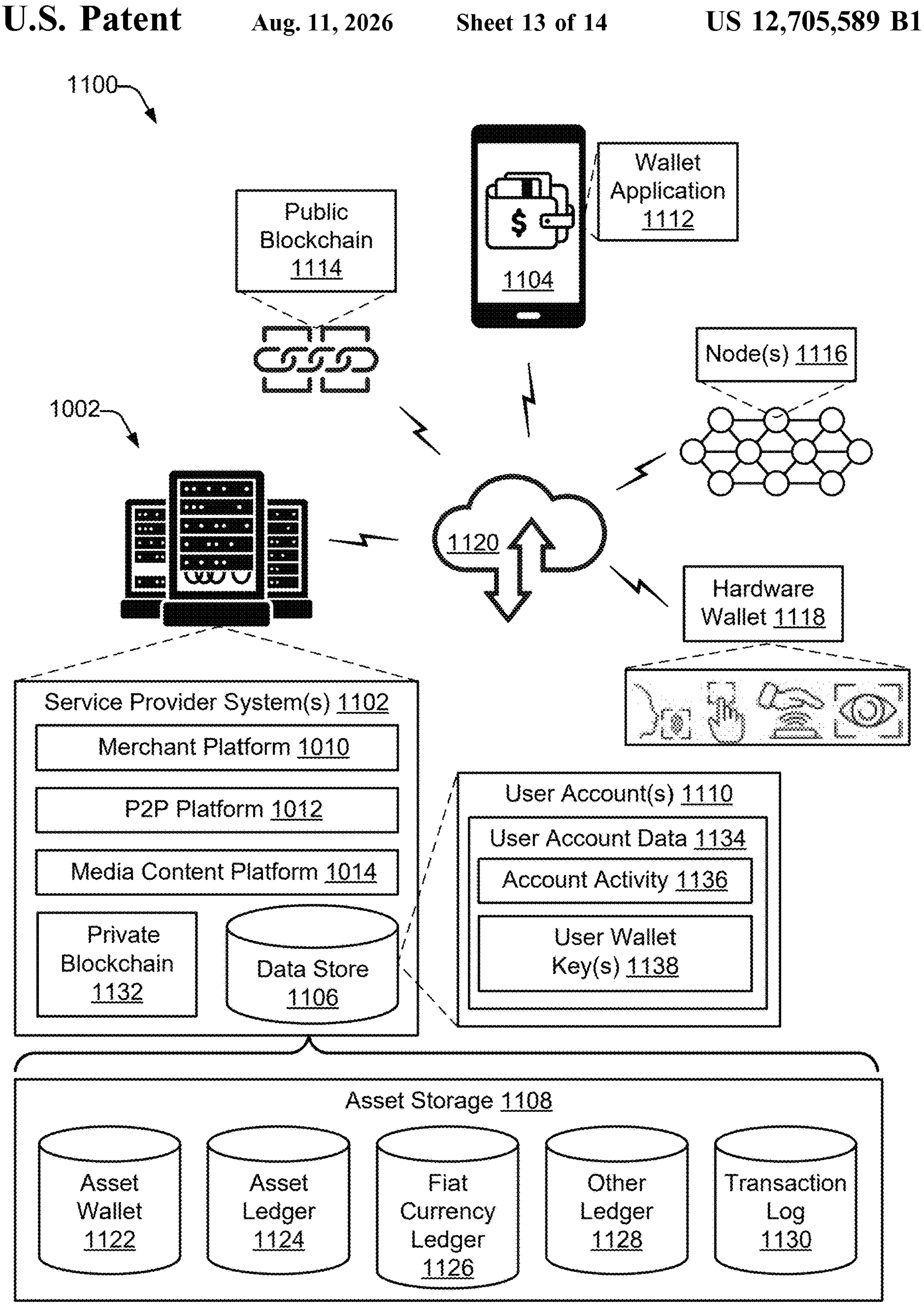
FIG. 11 is an example environment for performing techniques described herein.

In some examples, the P2P platform 1012 can utilize a ledger system to track transfers of assets between users 1016. FIG. 11, below, provides additional details associated with such a ledger system. The ledger system can enable users 1016 to own fractional shares of assets that are not conventionally available. For instance, a user can own a fraction of a Bitcoin, an NFT, or a stock. Additional details are described herein.

In at least one example, the P2P platform 1012 can facilitate transfers and can send notifications related thereto to instances of the payment application 1026 executing on user device(s) of payee(s). As an example, the P2P platform 1012 can transfer assets from an account of a first user to an account of a second user and can send a notification to the user device 1006(B) of the second user for presentation via a user interface. The notification can indicate that a transfer is in process, a transfer is complete, or the like. In some examples, the P2P platform 1012 can send additional or alternative information to the instances of the payment application 1026 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1012 funds the request to payee on behalf of the payor, to speed up the transfer process and compensate for lags that may be attributed to the payor's financial network.

In some examples, the P2P platform 1012 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee ((₹)), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1026 executing on the end user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1012 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 10 or a third-party service provider associated with the server(s) 1008. In examples where the content provider is a third-party service provider, the server(s) 1008 can be accessible via one or more APIs 1018 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1012 (e.g., the P2P platform 1012 offers a chat or messaging service that is within the payment application or accessible via the payment application). In some examples, the messaging application can be external to the P2P platform 1012. (e.g., the messaging application is hosted by a third-party service provider associated with the server(s) 1008, which can be accessible via one or more of the APIs 1018 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1012 can enable users 1016 to perform banking transactions via instances of the payment application 1026. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1012 can enable users to allocate funds between different accounts, sub-accounts, or balances (e.g., spending, saving, different assets, different currencies), etc. Further, users 1016 can configure bill pay, recurring payments, and/or the like using assets associated with their accounts. In some examples, the P2P platform 1012, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1012 enables users to buy and/or sell assets via asset networks such as cryptocurrency networks, securities networks, and/or the like. In some examples, acquisition of such assets can be in whole or fractional shares. The ledger system described below with reference to FIG. 11 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1012 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1012 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1012 can automatically apply the amount of funds associated with the gift card to the transaction.

In some examples, users can configure their account such that when they use their payment instruments, the P2P platform 1012 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1012 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1012 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1012 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1012.

In some examples, components of the environment 1000 may be integrated to enable payments at the point-of-sale using assets associated with user accounts of the P2P platform 1012. As illustrated in the environment 1000, the components can communicate with one another via the network 1004, where one or more APIs 1018 or other functional components can be used to facilitate such communication.

In at least one example, an integration can enable a customer to participate in a transaction via their own computing device (e.g., user device 1006(B)) instead of interacting with a merchant device of a merchant, such as the seller device 1006(A). In such an example, the POS application 1020, associated with a payment processing platform and executable by the seller device 1006(A) of the merchant, can present a Quick Response (QR) code, or other code that can be used to identify a transaction (e.g., a transaction code), in association with a transaction between the customer and the merchant. The QR code, or other transaction code, can be provided to the POS application 1020 via an API 1018 associated with the peer-to-peer payment platform. In an example, the customer can utilize their own computing device, such as the user device 1006(B), to capture the QR code, or the other transaction code, and to provide an indication of the captured QR code, or other transaction code, to server(s) 1002.

Based at least in part on the integration of the peer-to-peer payment platform and the payment processing platform (e.g., via the API 1018), the server(s) 1002 of the merchant platform 1010 can exchange communications with a payment application 1026 associated with the P2P platform 1012 and/or the POS application 1020 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1012 and merchant platform 1010 (which can be a first- or third-party integration) such that a QR code, or other transaction code, specific to the transaction can be used for providing transaction details, location details, customer details, or the like to a computing device of the customer, such as the user device 1006(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1006(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1020 and the payment application 1026, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1006(B), can be specially configured as a buyer-facing device having functionality similar to the functionality described above in the brick-and-mortar example.

In some examples, based at least in part on capturing the QR code, or other transaction code, the merchant platform 1010 can provide transaction data to the P2P platform 1012 for presentation via the payment application 1026 on the computing device of the customer, such as the user device 1006B(B), to enable the customer to complete the transaction via their own computing device. In some examples, in response to receiving an indication that the QR code, or other transaction code, has been captured or otherwise interacted with via the customer computing device, the P2P platform 1012 can determine that the customer authorizes payment of the transaction using funds associated with a stored balance of the customer that is managed and/or maintained by the P2P platform 1012. Such authorization can be implicit such that the interaction with the transaction code can imply authorization of the customer. Alternatively or additionally, the P2P platform 1012 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1012 can transfer funds from the stored balance of the customer to the merchant platform 1010. In at least one example, the merchant platform 1010 can deposit the funds, or a portion thereof, into a stored balance of the merchant that is managed and/or maintained by the merchant platform 1010. In such an example, the merchant platform 1010 can be a "peer" to the customer in a peer-to-peer transaction.

In some examples, techniques described herein can enable the customer to interact with the transaction after payment for the transaction has been settled. For example, in at least one example, the merchant platform 1010 can cause a total amount of a transaction to be presented via a user interface associated with the payment application 1026 such that the customer can provide gratuity, feedback, loyalty information, or the like, via an interaction with the user interface. In another example, the merchant platform 1010 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1012, if the customer inputs a tip and/or an event affecting the total amount of the transaction is triggered, the P2P platform 1012 can transfer additional funds, associated with the tip or event, to the merchant platform 1010. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1026 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1012 as described herein (e.g., a debit card linked to a stored balance of a customer) such that when the payment instrument is caused to interact with a payment reader, the merchant platform 1010 can exchange communications with the P2P platform 1012 to authorize payment for a transaction and/or provision associated transaction data to a computing device of the customer associated with the transaction.

Turning now to media content functionality provided by the environment 1000, the media content platform 1014 can provide digital media to a content consumption device 1006(D) where playback may occur using "streaming." In examples, "streaming" media content involves encoding the media content and transmitting the encoded media content over the network 1004 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1014 can provide a digital media streaming service (e.g., subscription-based, non-subscription-based) that enables a content consumption device 1006(D) to stream and/or download digital media content via a listener application 1028 installed on the content consumption device 1006(D). For instance, the media content platform 1014 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1006(D), the listener application 1028 may verify access rights to the digital media content items at time intervals, for instance intermittently (e.g., when the content consumption device 1006(D) has a network connection with the media content platform 1014 via the network(s) 1004), and/or at regular intervals (e.g., daily, weekly, monthly, etc.). In examples, access rights to the digital media content items may be provided when a subscription to the media content platform 1014 is active, while access rights to the digital media content items may be withheld when the subscription to the media content platform 1014 is terminated. Enabling storage on the end user devices 1006 and subsequent access to digital media content items via the listener application 1028 provides the users 1016 with the ability to access the digital media content items "offline" such as when a connection to the media content platform 1014 via the network(s) 1004 is unavailable or unreliable.

In some examples, the media content platform 1014 may additionally or alternatively provide an artist management service that enables the users 1016 to manage aspects of artist business via an artist application 1030 installed on the artist user device 1006(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1016 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1016 may have access to a single user account via respective end user devices 1006, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1030 and the listener application 1028 may be distinct applications having differing user experiences and verification processes for access, such as illustrated in the environment 1000. For instance, the media content platform 1014 may request additional verification, such as a link to an artist website, a sample of an artist's work, a verified credential supplied by a third party, etc. to grant access to the artist application 1030 in addition to information requested to access the listener application 1028. Further, the artist application 1030 may provide the artist management services described herein, without the subscription-based digital media streaming services described herein, and vice versa. However, examples are also considered in which functionality provided by the artist application 1030 and the listener application 1028 partially or fully overlap, and/or where verification processes for access are substantially similar.

In at least some examples, the media content platform 1014 enables interaction between the users 1016 utilizing the listener application 1028 installed on the content consumption devices 1006(D), and the users 1016 utilizing the artist application 1030 installed on the artist user devices 1006(E). For example, the media content platform 1014 may provide interconnectivity between the subscription-based digital media streaming service and the artist management service. Functionality provided by the media content platform 1014 in such instances may include a communication channel between one or more of the users 1016 (e.g., a listener, fan, music supervisor, publisher, etc.) utilizing the listener application 1028 and another user (e.g., an artist) of the users 1016 utilizing the artist application 1030. The communication channel may include, for instance, a messaging platform (also referred to as a "messaging application" herein), a live streaming platform, a videoconferencing or teleconferencing platform, and/or a combination of these.

Additionally, in some cases, the media content platform 1014 may facilitate a resource transfer between the listener application 1028 and the artist application 1030. In an example, the media content platform 1014 may direct a resource, such as a portion of a subscription fee paid by one of the users 1016 designated as a listener, to one or more of the users 1016 designated as artists based on a number of instances that the listening user consumed (e.g., streamed, downloaded, etc.) content created by respective ones of the artist users. Alternatively or additionally, the media content platform 1014 may direct a resource, such as funds, from an account associated with a listening user to an account associated with an artist user (or vice versa), in accordance with transfers between accounts as described herein. The media content platform 1014 may facilitate resource transfers in examples such as merchandise purchases, event ticket purchases, "tipping" an artist, payments for royalties or other fees, and so forth.

In some examples, the media content platform 1014 enables interaction between individual ones of the users 1016 with one another via the listener application 1028 installed on the content consumption device 1006(D) and other of the content consumption devices 1006(D) via a communication channel as described above. In an example, the listener application 1028 may provide functionality via a communication channel for a user to stream an individual digital media item, a playlist, or the like to an audience comprising other ones of the content consumption devices 1006(D). Alternatively or additionally, the communication channel may facilitate sharing of individual digital media items, playlists, user and/or artist profiles, and the like between the users 1016 via messages, uniform resource locators (URLs), quick response (QR) codes, and so forth.

In some cases, the media content platform 1014 enables interaction between individual ones of the users 1016 with one another via the artist application 1030 installed on the artist user device 1006(E) and other of the artist devices 1006(E) via a communication channel as described above. In some instances, the media content platform 1014 may provide recommendations for a particular user indicating which of the other users 1016 to communicate with. Such a recommendation may be based on a similarity (or dissimilarity) of content created by two or more of the users 1016, an overlap (or lack thereof) of audience members of the users 1016, a geographic location of the users 1016, a coinciding event location of the users 1016, and so forth. In some examples, a user may input parameters for a desired connection via the artist application 1030, and the media content platform 1014 may filter which of the users 1016 to surface for recommendations to the user based on the input parameters. Alternatively or additionally, the media content platform 1014 may implement one or more machine learning models to filter which of the users 1016 to surface for recommendations to the user. The recommendations provided by the media content platform 1014 may be data driven and thus increase relevance of communications presented to the users 1016 and reduce unsolicited communications that may be received by the users 1016.

The media content platform 1014 may interact with the server(s) 1008 associated with the third-party service providers to, for instance, ingest digital media items, report digital media consumption data, pay royalties, and the like. In some examples, the server(s) 1008 may be accessible by the media content platform 1014 via one or more APIs 1018 or other integrations. In some cases, the third-party service provider may be a digital media content provider (e.g., a record label, a performance rights organization (PRO), an independent artist, etc.). In such cases, the media content platform 1014 may receive digital media content items from the server(s) 1008, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1014 may use the metadata to associate the digital media content item as being created by a particular user, to provide search results to the users 1016, to generate playlists, and so forth. Further, the media content platform 1014 may provide payments (e.g., royalties) to the third-party service provider based on a number of streams and/or downloads of individual digital media content items by the users 1016 via the listener application 1028.

Techniques described herein are directed to services provided via a distributed system of end user devices 1006 that are in communication with server(s) 1002 of the service provider. That is, techniques described herein are directed to a specific implementation—or, a practical application—of utilizing a distributed system of end user devices 1006 that are in communication with server(s) 1002 of the merchant platform 1010, the P2P platform 1012, and/or the media content platform 1014 to perform a variety of services, as described above. The unconventional configuration of the distributed system described herein enables the server(s) 1002 that are remotely-located from end-users (e.g., users 1016) to intelligently offer services based on aggregated data associated with the end-users, such as the users 1016 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 1010, the P2P platform 1012, and/or the media content platform 1014, and those outside of the control of these service providers, to track the standing (payables, receivables, payroll, invoices, appointments, capital, balances, collaborations, etc.) of the users 1016. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1016 and end user devices 1006. Furthermore, such features are changed dynamically based on the profiles of the users involved interacting with the GUIs. As such, techniques described herein are directed to improvements to computing systems.

The merchant platform 1010, the P2P platform 1012, and/or the media content platform 1014 are capable of providing additional or alternative services, and the services described above are offered as a sampling of services. In at least one example, the merchant platform 1010, the P2P platform 1012, and/or the media content platform 1014 can exchange data with the server(s) 1008 associated with third-party service providers. Such third-party service providers can provide information that enables the merchant platform 1010, the P2P platform 1012, and/or the media content platform 1014 to provide services, such as those described above. In additional or alternative examples, such third-party service providers can access services of the merchant platform 1010, the P2P platform 1012, and/or the media content platform 1014. That is, in some examples, the third-party service providers can be subscribers, or otherwise access, services of the merchant platform 1010, the P2P platform 1012, and/or the media content platform 1014.

FIG. 11 illustrates an example environment 1100 including a service provider system 1102 which may be associated with the server(s) 1002 of FIG. 10. The environment 1100 may also include a user device 1104, which may correspond to any of the end user devices 1006 described in relation to FIG. 10. In examples, the service provider system 1102 may include one or a combination of the merchant platform 1010, the P2P platform 1012, or the media content platform 1014, as well as one or more data store(s) 1106 that can store assets in an asset storage 1108, as well as data in user account(s) 1110. In some examples, the environment 1100 may also include a public blockchain 1114, one or more nodes 1116, and/or a hardware wallet 1118. The service provider system 1102, the user device 1104, public blockchain 1114, the node(s) 1116, and the hardware wallet 1118 may be connected and able to communicate via one or more networks 1120, which may have the same or similar functionality described in relation to the network 1004 of FIG. 10.

In some examples, user account(s) 1110 can include merchant account(s), customer account(s), media content subscriber account(s), artist account(s), and so forth. In some examples, the user account(s) 1110 may be the same as or similar to the user account(s) 118 introduced in FIG. 1. In at least one example, the asset storage 1108 can be used to record whether individual assets are registered to a user account 1110. For example, the asset storage 1108 can include asset wallet(s) 1122 for storing records of assets owned by the service provider system 1102, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1008 of FIG. 10 can be associated therewith.

The asset wallet 1122 can be associated with one or more addresses and can vary addresses used to acquire assets (e.g., from the asset network(s)) so that its holdings are represented under a variety of addresses on the asset network. In examples where the service provider system 1102 has holdings of cryptocurrency (e.g., in the asset wallet 1122), a user can acquire cryptocurrency directly from the service provider system 1102. In some examples, the service provider system 1102 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1102 can provide the same or similar functionality for securities or other assets.

The asset storage 1108 may contain ledgers that store records of assignments of assets to users 1016. Specifically, the asset storage 1108 may include asset ledger 1124, fiat currency ledger 1126, and/or other ledger(s) 1128, which can be used to record transfers of assets between users 1016 and/or one or more third-parties (e.g., merchant network(s), payment card network(s), ACH network(s), equities network(s), the asset network, securities networks, etc.). In doing so, the asset storage 1108 can maintain a running balance of assets managed by the service provider system 1102. The ledger(s) of the asset storage 1108 can further indicate some of the running balance for individual ledger(s) stored in the asset storage 1108 are assigned or registered to one or more user account(s) 1110.

In at least one example, the asset storage 1108 can include transaction logs 1130, which can include, as transaction data, records of past transactions involving the service provider system 1102 and/or the user account 1110. In some examples, the data store(s) 1106 can store a private blockchain 1132. A private blockchain 1132 can function to record sender addresses, recipient addresses, public keys, values of cryptocurrency transferred, and/or can be used to verify ownership of cryptocurrency tokens to be transferred. In some examples, the service provider system 1102 can record transactions involving cryptocurrency until the number of transactions has exceeded a determined limit (e.g., number of transactions, storage space allocation, etc.). Based at least in part on determining that the limit has been reached, the service provider system 1102 can publish the transactions in the private blockchain 1132 to the public blockchain 1114 (e.g., associated with the asset network), where miners can verify the transactions and record the transactions to blocks on the public blockchain 1114. In at least one example, the service provider system 1102 can participate as miner(s) at least for transactions to which the respective platform is a party to, to be posted to the public blockchain 1114.

In some cases, the data store(s) 1106 can store and/or manage multiple user accounts, an example of which is described in relation to the user account 1110. In at least one example, the user account 1110 can include user account data 1134, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1134 can include account activity 1136 and user wallet key(s) 1138. In some examples, the user wallet key(s) 1138 can include a public-private key-pair and a respective address associated with the asset network or other asset networks. In some examples, the user wallet key(s) 1138 may include one or more key pairs, which can be unique to the asset network or other asset networks.

In addition to the user account data 1134, the user account 1110 can include ledger(s) for account(s) managed by the service provider system 1102, for the user. For example, the user account 1110 may include an asset ledger 1124, a fiat currency ledger 1126, and/or one or more other ledgers 1128. The ledger(s) can indicate that a corresponding user utilizes the service provider system 1102 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1102.

In some examples, the asset ledger 1124 can store a balance for each of one or more cryptocurrencies (e.g., Bitcoin, Ethereum, Litecoin, etc.) registered to the user account 1110. In at least one example, the asset ledger 1124 can further record transactions of cryptocurrency assets associated with the user account 1110. For example, the user account 1110 can receive cryptocurrency from the asset network using the user wallet key(s) 1138. In some examples, the user wallet key(s) 1138 may be generated for the user upon request. User wallet key(s) 1138 can be requested by the user in order to send, exchange, or otherwise control the balance of cryptocurrency held by the service provider system 1102 (e.g., in the asset wallet 1122) and registered to the user. In some examples, the user wallet key(s) 1138 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1102 and the value is credited as a balance in asset ledger 1124), by purchasing currency in the form associated with the account using currency in a different form (e.g., buying a value of cryptocurrency from the service provider system 1102 using a value of fiat currency reflected in fiat currency ledger 1126, and crediting the value of cryptocurrency in asset ledger 1124), or by conducting a transaction with another user (customer or merchant) of the service provider system 1102 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1102 (i.e., an external account). Such a transaction can request that the user to transfer an amount of the cryptocurrency in a message signed by user's private key to an address provided by the service provider system 1102. In at least one example, the transaction can be sent to miners to bundle the transaction into a block of transactions and to verify the authenticity of the transactions in the block. Once a miner has verified the block, the block is written to the public blockchain 1114 where the service provider system 1102 can then verify that the transaction has been confirmed and can credit the user's asset ledger 1124 with the transferred amount. When an account is funded by transferring cryptocurrency from a third-party cryptocurrency wallet, an update can be made to the public blockchain 1114. In some cases, this update of the public blockchain 1114 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1102. As described above, in some examples, the service provider system 1102 can acquire cryptocurrency from a third-party source. In examples where the service provider system 1102 has its own cryptocurrency assets, cryptocurrency transferred in a transaction (e.g., data with address provided for receipt of transaction and a balance of cryptocurrency transferred in the transaction) can be stored in an asset wallet 1122 associated with the service provider system 1102. In at least one example, the service provider system 1102 can credit the asset ledger 1124 of the user. Additionally, while the service provider system 1102 recognizes that the user retains the value of the transferred cryptocurrency through crediting the asset ledger 1124, an inspection of the blockchain will show the cryptocurrency as having been transferred to the service provider system 1102. In some examples, the asset wallet 1122 can be associated with many different addresses. In such examples, an inspection of the blockchain may not necessarily associate all cryptocurrency stored in asset wallet 1122 as belonging to the same entity. The presence of a private ledger used for real-time transactions and maintained by the service provider system 1102, combined with updates to the public ledger at other times, allows for extremely fast transactions using cryptocurrency to be achieved. In some examples, the "private ledger" can refer to the asset ledger 1124, which in some examples, can utilize the private blockchain 1132, as described herein. The "public ledger" can correspond to the public blockchain 1114 associated with the asset network.

In at least one example, an asset ledger 1124, fiat currency ledger 1126, or the like associated with the user account 1110 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1124. In some examples, a user can receive fiat currency or another currency in the form of payment for a transaction with another user. In at least one example, at least a portion of such funds can be converted into cryptocurrency by the service provider system 1102 and used to fund the asset ledger 1124 of the user.

In examples, a user can also have an account in U.S. dollars, which can be tracked, for example, via the fiat currency ledger 1126. Such an account can be funded by transferring money from a bank account at a third-party bank to an account maintained by the service provider system 1102 as is conventionally known. In some examples, a user can receive fiat currency in the form of payment for a transaction with another user. In such examples, at least a portion of such funds can be used to fund the fiat currency ledger 1126.

In some examples, a user can have one or more internal payment cards registered with the service provider system 1102. Internal payment cards can be linked to one or more of the accounts associated with the user account 1110. In some embodiments, options with respect to internal payment cards can be adjusted and managed using an application (e.g., the payment application 1026, a wallet application 1112, etc.).

In at least one example, the user account 1110 can be associated with the asset wallet accessible via a wallet application 1112 of the user device 1104, or a stored balance for use in payment transactions, peer-to-peer transactions, payroll payments, etc. In at least one example, the asset wallet 1122 can store data indicating an address provided for receipt of a cryptocurrency transaction. In at least one example, the balance of the asset wallet 1122 can be based at least in part on a balance of the asset ledger 1124. In at least one example, funds availed via the asset wallet 1122 can be stored in the asset wallet 1122. Funds availed via the asset wallet 1122 can be tracked via the asset ledger 1124. The asset wallet 1122, however, can be associated with additional cryptocurrency funds.

In at least one example, when the service provider system 1102 includes a private blockchain 1132 for recording and validating cryptocurrency transactions, the asset wallet 1122 can be used instead of, or in addition to, the asset ledger 1124. For example, a merchant can provide the address of the asset wallet 1122 for receiving payments. In an example where a customer is paying in cryptocurrency and the customer has their own cryptocurrency wallet account associated with the service provider system 1102, the customer can send a message signed by its private key including its wallet address (i.e., of the customer) and identifying the cryptocurrency and value to be transferred to the merchant's asset wallet 1122. The service provider system 1102 can complete the transaction by reducing the cryptocurrency balance in the customer's cryptocurrency wallet and increasing the cryptocurrency balance in the merchant's asset wallet 1122. In addition to recording the transaction in the respective cryptocurrency wallets, the transaction can be recorded in the private blockchain 1132 and the transaction can be confirmed. A user can perform a similar transaction with cryptocurrency in a peer-to-peer transaction as described above.

While the asset ledger 1124 and/or asset wallet 1122 are each described above with reference to cryptocurrency, the asset ledger 1124 and/or asset wallet 1122 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1102 is an aspect of the technology disclosed that enables technical advantages of increased processing speed and improved security.

The description of the environment 1100 above generally relates to a centralized service provider system 1102 that at least partially facilitates storing and managing assets in the data store 1106. However, the environment 1100 may also facilitate decentralized storage and management of assets alternatively or in addition to centralized storage and management as described above. For instance, the environment 1100 may include a decentralized platform implemented using a plurality of nodes (e.g., web nodes), an example of which is illustrated as node 1116. The node 1116 is representative of a computer or other device tasked with validating transactions and/or maintaining a copy of a blockchain ledger, such as a ledger associated with the public blockchain 1114. The decentralized platform may be implemented via the environment 1100 through use of decentralized identifiers and verifiable credentials that are stored and managed by user devices 1104. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1102). The decentralized identity referenced by a decentralized identifier gives an entity control over what data can be accessed, stored, modified, and so forth by other entities, such as the service provider system 1102.

The node 1116, as representative of one of a plurality of decentralized nodes (e.g., decentralized web nodes), supports data storage and relays that allows entities, service provider systems, individuals, organizations and so forth to send, store, and receive encrypted or public messages and data. The node 1116 is universally addressable and is "crawlable" using data addressing in relation to the decentralized identifiers. The node 1116 is also configured to support decentralized replication of data across the nodes that is consistent across multiple nodes over time through continued data communication between the nodes in the decentralized platform. The node 1116 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1104 may be an issuer, a holder, and/or a verifier, as can the service provider system 1102.

In some examples, the user device 1104 may implement a wallet application 1112 configured to manage decentralized identifiers and/or verifiable credentials. For instance, the wallet application 1112 may provide a user interface for implementation of access controls to various data associated with the decentralized identifier by the service provider system 1102, to other user devices, and so forth. Additionally, the wallet application 1112 may be configured to provide functionality for resource transfers (e.g., cryptocurrency, fiat currency, etc.) with the service provider system 1102, other user devices, and the like, based on techniques described herein.

In some examples, the hardware wallet 1118 may store cryptocurrency assets in combination with the wallet application 1112 and the service provider system 1102. For instance, the hardware wallet 1118, the wallet application 1112, and the service provider system 1102 may each store a respective, different private key, where a transaction with the cryptocurrency assets is signed by at least two of the three private keys. The user interface provided by the wallet application 1112 may allow a user to request a transaction. The wallet application 1112 may then sign the transaction with the private key of the wallet application 1112, have either the hardware wallet 1118 or the service provider system 1102 use a second of the three private keys to sign the transaction, and then provide the transaction with two signatures to the public blockchain 1114 for processing.

Figure 12:
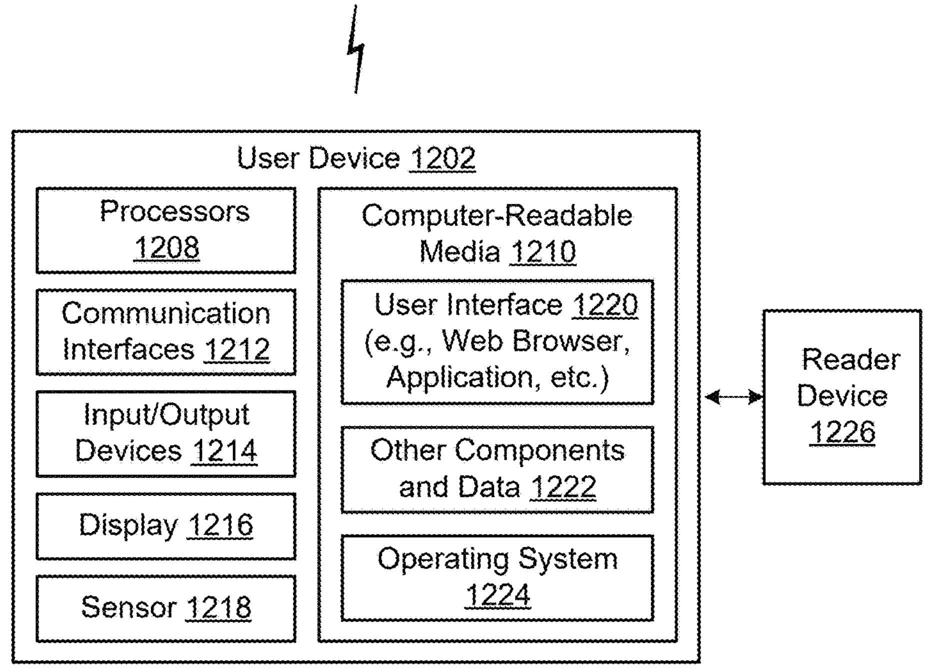
FIG. 12 is an example block diagram illustrating a system for performing techniques described herein.

FIG. 12 depicts an illustrative block diagram illustrating a system 1200 for performing techniques described herein. The system 1200 includes a user device 1202, that communicates with server computing device(s) (e.g., server(s) 1204) via network(s) 1206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1202 is illustrated, in additional or alternate examples, the system 1200 can have multiple user devices, as described above with reference to FIG. 10.

In some examples, the server(s) 1204 may be the same as or similar to the server(s) 112 introduced in FIG. 1, and the server(s) 1204 may implement the payment service 110. Accordingly, the server(s) 1204 may include the association component 138, the user interface component 140, the transaction component 142, and/or the import-export component 150, as described herein. Furthermore, the user device(s) 1202 may be the same as or similar to the user device(s) 104 introduced in FIG. 1, the network(s) 1206 may be the same as or similar to the network(s) 114 introduced in FIG. 1, and/or the data store(s) 1106 may be the same as or similar to the data store(s) 116 introduced in FIG. 1. In addition, the user interface 1220 may be a user interface of the payment application 108 introduced in FIG. 1.

In accordance with the examples described herein, the server(s) 1204 may facilitate payments for merchants that use multiple PSPs. The server(s) 1204 may receive a first request to establish a first on-file grant to enable a merchant to use an identifier associated with a user account of a user to process payments for future transactions, wherein the first request indicates a first PSP used by the merchant for processing payments, and the server(s) 1204 may store, in a data structure, a first association between the user, the merchant, and the first PSP to establish the first on-file grant. The server(s) 1204 may receive, from a merchant device of the merchant, a request to associate a second PSP with the merchant, and store, in the data structure, a group association between the merchant, the first PSP, and the second PSP. The server(s) 1204 may receive a second request to use the identifier for a transaction with the merchant, wherein the second request indicates that the transaction will be processed using the second PSP, and the server(s) 1204 may determine, based at least in part on the group association, that the identifier can be used for the transaction with the merchant, store, in the data structure, a second association between the user, the merchant, and the second PSP to establish a second on-file grant, and send a response to the second request indicating approval to use the identifier for payment of the transaction.

In at least one example, the user device 1202 can be any suitable type of computing device, e.g., portable, semi-portable, semi-stationary, or stationary. Some examples of the user device 1202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1202 can be any computing device capable of sending communications and performing the functions according to the techniques described herein. The user device 1202 can include devices, e.g., payment card readers, or components capable of accepting payments, as described below. The user device 1202 may be representative of, and provide functionality for, the user devices 1006 described in relation to FIG. 10.

In the illustrated example, the user device 1202 includes one or more processors 1208, one or more computer-readable media 1210, one or more communication interface(s) 1212, one or more input/output (I/O) devices 1214, a display 1216, sensor(s) 1218, one or more encoders 1246, and one or more decoders 1248.

In at least one example, each processor 1208 can itself comprise one or more processors or processing cores. For example, the processor(s) 1208 can be implemented as one or more microprocessors, microcomputers, microcontrollers, digital signal processors, central processing units, state machines, logic circuitries, and/or any devices that manipulate signals based on operational instructions. In some examples, the processor(s) 1208 can be one or more hardware processors and/or logic circuits of any suitable type specifically programmed or configured to execute the algorithms and processes described herein. The processor(s) 1208 can be configured to fetch and execute computer-readable processor-executable instructions stored in the computer-readable media 1210.

Depending on the configuration of the user device 1202, the computer-readable media 1210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1210 can include, but is not limited to, RAM, ROM, EEPROM, flash memory, solid-state storage, magnetic disk storage, optical storage, and/or other computer-readable media technology. Further, in some examples, the user device 1202 can access external storage, such as RAID storage systems, storage arrays, network attached storage, storage area networks, cloud storage, or any other medium that can be used to store information and that can be accessed by the processor(s) 1208 directly or through another computing device or network. Accordingly, the computer-readable media 1210 can be computer storage media able to store instructions, components or components that can be executed by the processor(s) 1208. Further, when mentioned, non-transitory computer-readable media exclude media such as energy, carrier signals, electromagnetic waves, and signals per se.

The computer-readable media 1210 can be used to store and maintain any number of functional components that are executable by the processor(s) 1208. In some implementations, these functional components comprise instructions or programs that are executable by the processor(s) 1208 and that, when executed, implement operational logic for performing the actions and services attributed above to the user device 1202. Functional components stored in the computer-readable media 1210 can include a user interface 1220 to enable users to interact with the user device 1202, and thus the server(s) 1204 and/or other networked devices. In some examples, the user interface 1220 can be the user interface(s) 300, 400, and/or 900, as described herein. In at least one example, a user can interact with the user interface via touch input, spoken input, gesture, or any other type of input. The word "input" is also used to describe "contextual" input that may not be directly provided by the user via the user interface 1220. For example, user's interactions with the user interface 1220 are analyzed using, e.g., natural language processing techniques, user movement tracking techniques, eye tracking techniques, etc. to determine context or intent of the user, which may be treated in a manner similar to "direct" user input.

Depending on the type of the user device 1202, the computer-readable media 1210 can also optionally include other functional components and data, such as other components and data 1222, which can include programs, drivers, etc., and the data used or generated by the functional components. In addition, the computer-readable media 1210 can also store data, data structures and the like, that are used by the functional components. Further, the user device 1202 can include many other logical, programmatic and physical components, of which those described are merely examples that are related to the discussion herein.

In at least one example, the computer-readable media 1210 can include additional functional components, such as an operating system 1224 for controlling and managing various functions of the user device 1202 and for enabling user interactions.

The communication interface(s) 1212 can include one or more interfaces and hardware components for enabling communication with various other devices, such as over the network(s) 1206 or directly. For example, communication interface(s) 1212 can enable communication through one or more network(s) 1206, which can include, but are not limited to any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1202 can further include one or more input/output (I/O) devices 1214. The I/O devices 1214 can include speakers, a microphone, a camera, and various user controls (e.g., buttons, a joystick, a keyboard, a keypad, etc.), a haptic output device, and so forth. The I/O devices 1214 can also include attachments that leverage the accessories (audio-jack, USB-C, Bluetooth, etc.) to connect with the user device 1202.

In at least one example, user device 1202 can include a display 1216. Depending on the type of computing device(s) used as the user device 1202, the display 1216 can employ any suitable display technology. For example, the display 1216 can be a liquid crystal display, a plasma display, a light emitting diode display, an OLED (organic light-emitting diode) display, an electronic paper display, or any other suitable type of display able to present digital content thereon. In at least one example, the display 1216 can be an augmented reality display, a virtual reality display, or any other display able to present and/or project digital content. In some examples, the display 1216 can have a touch sensor associated with the display 1216 to provide a touchscreen display configured to receive touch inputs for enabling interaction with a graphic interface presented on the display 1216. Accordingly, implementations herein are not limited to any particular display technology. In some examples, the user device 1202 may not include the display 1216, and information can be presented by other means, such as aurally, haptically, etc.

In addition, the user device 1202 can include sensor(s) 1218. The sensor(s) 1218 can include a global positioning system ("GPS") device able to indicate location information. Further, the sensor(s) 1218 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 1010, the P2P platform 1012, and/or the media content platform 1014, described above, to provide one or more services. That is, in some examples, the service provider can implement geofencing to provide particular services to users by the merchant platform 1010, the P2P platform 1012, and/or the media content platform 1014.

In examples, the user device 1202 includes a codec system, which may comprise an encoder 1246 and/or a decoder 1248. The encoder 1246 is configured to encode a data stream or signal from an analog signal (e.g., an analog audio signal, an analog video signal, etc.) to a digital signal for transmission or storage. The decoder 1248 is configured to convert the digital signal back to an analog signal, such as for playback or editing. In some cases, the encoder 1246 may be configured to encode the data stream or analog signal in an encrypted format, and the decoder 1248 may accordingly be configured to decrypt the digital signal as part of the decoding process (e.g., using a cryptographic key). Additionally, in some examples, the encoder 1246 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1246 and/or the decoder 1248 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1200, the server 1204 may include an encoder 1246 and/or a decoder 1248 as well.

Additionally, the user device 1202 can include various other components that are not shown, examples of which include removable storage, a power source, such as a battery and power control unit, a barcode scanner, a printer, a cash drawer, and so forth.

In addition, as described in relation to FIG. 10, the user device 1202 can include, be connectable to, or otherwise be coupled to a reader device 1226, for reading payment instruments and/or identifiers associated with payment objects. The reader device 1226 can include a read head for reading a magnetic strip of a payment card, and further can include encryption technology for encrypting the information read from the magnetic strip. Additionally or alternatively, the reader device 1226 can be an EMV payment reader, which in some examples, can be embedded in the user device 1202. Moreover, numerous other types of readers can be employed with the user device 1202 herein, depending on the type and configuration of the user device 1202.

The reader device 1226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1226 may include hardware implementation, such as slots, magnetic tracks, and rails with one or more sensors or electrical contacts to facilitate detection and acceptance of a payment instrument. That is, the reader device 1226 may include hardware implementations to enable the reader device 1226 to interact with a payment instrument via a swipe, a dip, or a tap to obtain payment data associated with a customer. Additionally or optionally, the reader device 1226 may also include a biometric sensor to receive and process biometric characteristics and process them as payment instruments, given that such biometric characteristics are registered with the payment service and connected to a financial account with a bank server. The reader device 1226 may include processing unit(s), computer-readable media, a reader chip, a transaction chip, a timer, a clock, a network interface, a power supply, and so on. That is, the reader device 1226 may include any of the computing components described herein with reference to the user device 1202 to implement the functionality provided by the reader device 1226.

In examples, the reader device 1226 includes a reader chip, which may perform functionality to control the power supply, among other functionality of the reader device 1226. The power supply may include one or more power supplies such as a physical connection to AC power or a battery. Power supply may include power conversion circuitry for converting AC power and generating a plurality of DC voltages for use by components of reader device 1226. When power supply includes a battery, the battery may be charged via a physical power connection, via inductive charging, or via any other suitable method.

The reader device 1226 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1202, which can be a POS terminal, and the reader device 1226 are shown as separate devices, in additional or alternative examples, the user device 1202 and the reader device 1226 can be part of a single device, which may be a battery-operated device. In some examples, the reader device 1226 can have a display integrated therewith, which can be in addition to (or as an alternative of) the display 1216 associated with the user device 1202.

The server(s) 1204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1204 can include one or more processors 1228, one or more computer-readable media 1230, one or more I/O devices 1232, and one or more communication interfaces 1234. Each processor 1228 can be a single processing unit or a number of processing units, and can include single or multiple computing units or multiple processing cores. The processor(s) 1228 can be implemented as one or more microprocessors, microcomputers, microcontrollers, digital signal processors, central processing units, state machines, logic circuitries, and/or any devices that manipulate signals based on operational instructions. For example, the processor(s) 1228 can be one or more hardware processors and/or logic circuits of any suitable type specifically programmed or configured to execute the algorithms and processes described herein. The processor(s) 1228 can be configured to fetch and execute computer-readable instructions stored in the computer-readable media 1230, which can program the processor(s) 1228 to perform the functions described herein.

The computer-readable media 1230 can include volatile and nonvolatile memory and/or removable and non-removable media implemented in any type of technology for storage of information, such as computer-readable instructions, data structures, program components, or other data. Such computer-readable media 1230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1204, the computer-readable media 1230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1230 can be used to store any number of functional components that are executable by the processor(s) 1228. In many implementations, these functional components comprise instructions or programs that are executable by the processors 1228 and that, when executed, specifically configure the one or more processors 1228 to perform the actions attributed above to the merchant platform 1010, the P2P platform 1012, and/or the media content platform 1014. Functional components stored in the computer-readable media 1230 can optionally include a merchant component 1236, a training component 1238, and one or more other components and data 1240, such as association component 138, the user interface component 140, the transaction component 142, and/or the import-export component 150, which were introduced in FIG. 1. The computer-readable media 1230 can additionally include an operating system 1242 for controlling and managing various functions of the server(s) 1204.

The merchant component 1236 can be configured to receive transaction data from POS systems. The merchant component 1236 can transmit requests (e.g., authorization, capture, settlement, etc.) to payment service server computing device(s) to facilitate POS transactions between merchants and customers. The merchant component 1236 can communicate the successes or failures of the POS transactions to the POS systems.

The training component 1238 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1202 and/or the server(s) 1204 for use at a time after the data models have been trained (e.g., at runtime).

The one or more other components and data 1240 can include the association component 138, the user interface component 140, the transaction component 142, and/or the import-export component 150, the functionality of which is described, at least partially, above. Further, the one or more other components and data 1240 can include programs, drivers, etc., and the data used or generated by the functional components. Further, the server(s) 1204 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1234 can include one or more interfaces and hardware components for enabling communication with various other devices, such as over the network(s) 1206 or directly. For example, communication interface(s) 1234 can enable communication through one or more network(s) 1206, which can include, but are not limited to any type of network known in the art, as described herein.

The server(s) 1204 can further be equipped with various I/O devices 1232. Such I/O devices 1232 can include a display, various user interface controls (e.g., buttons, joystick, keyboard, mouse, touch screen, biometric or sensory input devices, etc.), audio speakers, connection ports and so forth.

In at least one example, the system 1200 can include a datastore 1244 that can be configured to store data that is accessible, manageable, and updatable. In some examples, the datastore 1244 can be integrated with the user device 1202 and/or the server(s) 1204. In other examples, as shown in FIG. 12, the datastore 1244 can be located remotely from the server(s) 1204 and can be accessible to the server(s) 1204. The datastore 1244 can comprise multiple databases and/or servers connected locally and/or remotely via the network(s) 1206. In at least one example, the datastore 1244 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1244 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1244 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:

receiving, based on an input provided by a user, a first request to establish an on-file grant to enable a merchant to use an identifier associated with a user account of the user to process payments for future transactions, wherein the identifier is to be used as a payment proxy in lieu of payment data for paying for the future transactions, and wherein the first request indicates a first payment service provider (PSP) used by the merchant for processing payments;

creating, in a data structure, a first association between the user, the merchant, and the first PSP to establish the on-file grant;

receiving, from a merchant device of the merchant, a request to associate a second PSP with the merchant;

creating, in the data structure, a group association between the merchant, the first PSP, and the second PSP, wherein the group association enables the identifier to be used for the future transactions (i) regardless of whether the merchant uses the first PSP or the second PSP and (ii) without requiring the user to provide an additional input to establish an additional on-file grant to enable the merchant to use the identifier to process payments using the second PSP;

receiving a second request to use the identifier for a new transaction with the merchant, wherein the second request indicates that the new transaction will be processed using the second PSP;

determining, based on the group association, that the identifier can be used for the new transaction with the merchant;

creating, in the data structure, a second association between the user, the merchant, and the second PSP to establish the additional on-file grant; and sending a response to the second request indicating approval to use the identifier for payment of the new transaction.

2. The computer-implemented method of claim 1, further comprising:

receiving, based on user input provided via the user interface in association with the visual indication, a request to revoke approval of the merchant to use the identifier for transactions with the user;

identifying, based on the group association, the on-file grant and the additional on-file grant; and deleting the first association and the second association from the data structure to revoke the on-file grant and the additional on-file grant.

3. The computer-implemented method of claim 1, wherein the request to associate the second PSP with the merchant comprises a request to activate multi-PSP mode where the merchant can concurrently use the first PSP and the second PSP for processing payments using identifiers associated with user accounts of users.

4. The computer-implemented method of claim 1, wherein the payment data includes one of (i) a credit card number, (ii) a debit card number, or (iii) a bank account number, and the identifier has a particular syntax that includes a monetary currency indicator prefixing one or more alphanumeric characters.

5. The computer-implemented method of claim 4, wherein detection of the particular syntax triggers a transfer of funds from an account associated with the user to an account associated with the merchant for payment of the new transaction based on the currency indicator and the one or more alphanumeric characters.

6. A system comprising:

one or more processors; and memory storing computer-executable instructions that, when executed by the one or more processors, cause the one or more processors to perform operations comprising:

receiving a first request to establish a first on-file grant to enable a merchant to use an identifier associated with a user account of a user to process payments for future transactions, wherein the identifier is to be used as a payment proxy in lieu of payment data for paying for the future transaction, and wherein the first request indicates a first payment service provider (PSP) used by the merchant for processing payments;

storing, in a data structure, a first association between the user, the merchant, and the first PSP to establish the first on-file grant;

receiving, from a merchant device of the merchant, a request to associate a second PSP with the merchant;

storing, in the data structure, a group association between the merchant, the first PSP, and the second PSP;

receiving a second request to use the identifier for a transaction with the merchant, wherein the second request indicates that the transaction will be processed using the second PSP;

determining, based at least in part on the group association, that the identifier can be used for the transaction with the merchant;

storing, in the data structure, a second association between the user, the merchant, and the second PSP to establish a second on-file grant; and sending a response to the second request indicating approval to use the identifier for payment of the transaction.

7. The system of claim 6, wherein the request to associate the second PSP with the merchant comprises a request to concurrently use the first PSP and the second PSP for processing payments using identifiers associated with user accounts of users.

8. The system of claim 6, wherein the request to associate the second PSP with the merchant comprises a request to transition from using the first PSP to using the second PSP for processing payments using identifiers associated with user accounts of users.

9. The system of claim 8, the operations further comprising transferring data to a computing system associated with the second PSP, the data comprising existing on-file grant s associated with the merchant and the first PSP.

10. The system of claim 6, wherein the second PSP is associated with an entity that operates the system.

11. The system of claim 6, wherein the request to associate the second PSP with the merchant is received via a web portal or an application programming interface (API).

12. The system of claim 6, the operations further comprising, in response to the storing of the first association to establish the first on-file grant, causing presentation, via a user interface of a payment application executing on a user device of the user, of a visual indication that the merchant is approved to use the identifier for transactions with the user.

13. The system of claim 12, the operations further comprising, in response to the determining that the identifier can be used for the transaction with the merchant:

determining that the data structure includes data used for the causing of the presentation of the visual indication via the payment application executing on the user device; and based at least in part on the determining that the data structure includes the data, refraining from storing additional data that would cause presentation, via the user interface, of an additional visual indication that the merchant is approved to use the identifier for transactions with the user.

14. The system of claim 12, the operations further comprising:

receiving, based on user input provided via the user interface in association with the visual indication, a request to revoke approval of the merchant to use the identifier for transactions with the user;

identifying, based at least in part on the group association, the first on-file grant and the second on-file grant; and deleting the first association and the second association from the data structure to revoke the first on-file grant and the second on-file grant.

15. The system of claim 6, wherein:

the transaction is a second transaction with the merchant;

the first request is received in association with the user completing a first transaction with the merchant; and the first transaction occurs before the second transaction.

16. A computer-implemented method comprising:

receiving a first request to establish a first on-file grant to enable a merchant to use an identifier associated with a user account of a user to process payments for future transactions, wherein the identifier is to be used as a payment proxy in lieu of payment data for paying for future transactions, and wherein the first request indicates a first payment service provider (PSP) used by the merchant for processing payments;

storing, in a data structure, a first association between the user, the merchant, and the first PSP to establish the first on-file grant;

receiving, from a merchant device of the merchant, a request to associate a second PSP with the merchant;

storing, in the data structure, a group association between the merchant, the first PSP, and the second PSP;

receiving a second request to use the identifier for a transaction with the merchant, wherein the second request indicates that the transaction will be processed using the second PSP;

determining, based on the group association, that the identifier can be used for the transaction with the merchant;

storing, in the data structure, a second association between the user, the merchant, and the second PSP to establish a second on-file grant; and sending a response to the second request indicating approval to use the identifier for payment of the transaction.

17. The computer-implemented method of claim 16, wherein the request to associate the second PSP with the merchant comprises a request to concurrently use the first PSP and the second PSP for processing payments using identifiers associated with user accounts of users.

18. The computer-implemented method of claim 16, wherein the request to associate the second PSP with the merchant comprises a request to transition from using the first PSP to using the second PSP for processing payments using identifiers associated with user accounts of users.

19. The computer-implemented method of claim 16, wherein the request to associate the second PSP with the merchant is received via a web portal or an application programming interface (API).

20. The computer-implemented method of claim 16, further comprising, in response to the storing of the first association to establish the first on-file grant, causing presentation, via a user interface of a payment application executing on a user device of the user, of a visual indication that the merchant is approved to use the identifier for transactions with the user.

* * * * *